(12) United States Patent
Tanabe

(10) Patent No.: US 9,343,921 B2
(45) Date of Patent: May 17, 2016

(54) POWER SUPPLY APPARATUS, BATTERY PACK, METHOD, AND STORAGE MEDIUM

(75) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1098 days.

(21) Appl. No.: 13/303,455

(22) Filed: Nov. 23, 2011

(65) Prior Publication Data

US 2012/0146577 A1 Jun. 14, 2012

(30) Foreign Application Priority Data

Dec. 10, 2010 (JP) ................................ 2010-276167

(51) Int. Cl.
H02J 7/00 (2006.01)
H02J 1/10 (2006.01)
H02J 9/00 (2006.01)
H02J 7/02 (2016.01)

(52) U.S. Cl.
CPC ..................................... *H02J 7/025* (2013.01)

(58) Field of Classification Search
CPC ....................................................... H02J 7/025
USPC ................. 320/107–115, 103; 307/23, 66, 67
See application file for complete search history.

(56) References Cited

U.S. PATENT DOCUMENTS

| 8,044,639 B2 * | 10/2011 | Tamegai | ............... | H02J 7/0055 |
| | | | | 307/43 |
| 2009/0271048 A1 | 10/2009 | Wakamatsu | | |
| 2010/0194206 A1 | 8/2010 | Burdo | | |
| 2010/0277120 A1 | 11/2010 | Cook | | |
| 2011/0018494 A1 | 1/2011 | Mita | | |
| 2011/0140671 A1* | 6/2011 | Kim | ......................... | H02J 7/025 |
| | | | | 320/137 |
| 2011/0156636 A1 | 6/2011 | Kim | | |

FOREIGN PATENT DOCUMENTS

| CN | 1829037 A | 9/2006 |
| CN | 101136561 A | 3/2008 |
| CN | 101261549 A | 9/2008 |
| CN | 101667753 A | 3/2010 |
| CN | 201654673 U | 11/2010 |
| GB | 2485898 A | 5/2012 |
| JP | 10-021968 A | 1/1998 |
| JP | 2003-079075 A | 3/2003 |
| WO | 2010/068062 A | 6/2010 |

* cited by examiner

*Primary Examiner* — Richard Isla Rodas
*Assistant Examiner* — Michael Dibenedetto
(74) *Attorney, Agent, or Firm* — Canon USA, Inc. IP Division

(57) ABSTRACT

A power supply apparatus includes a power supply unit that wirelessly supplies power to an electronic device including a first unit that wirelessly receives power from the power supply apparatus, and a control unit that execute control, if an external apparatus, including a battery, and the electronic device are connected, to select the first unit to charge the battery by the first unit.

19 Claims, 11 Drawing Sheets

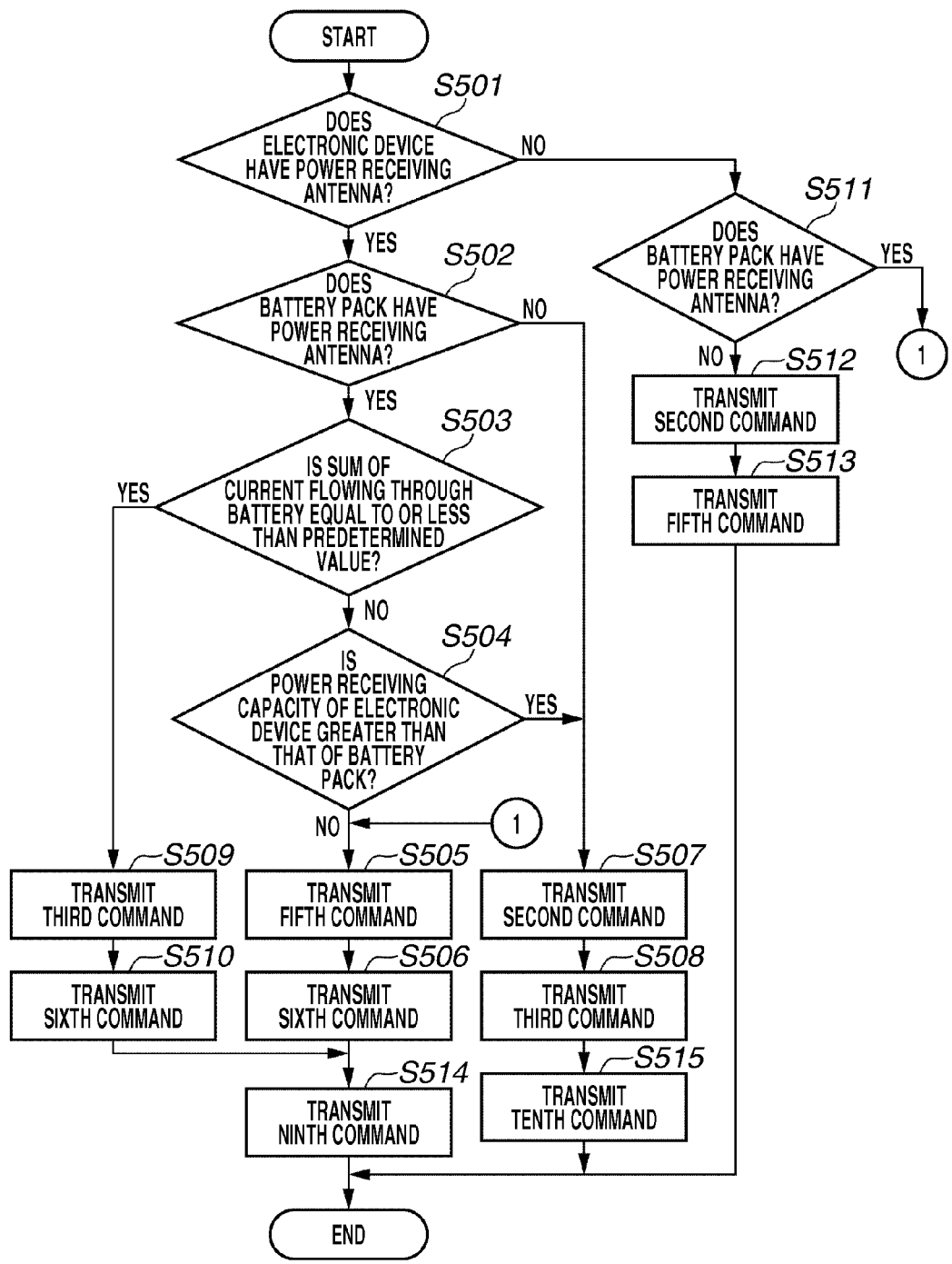

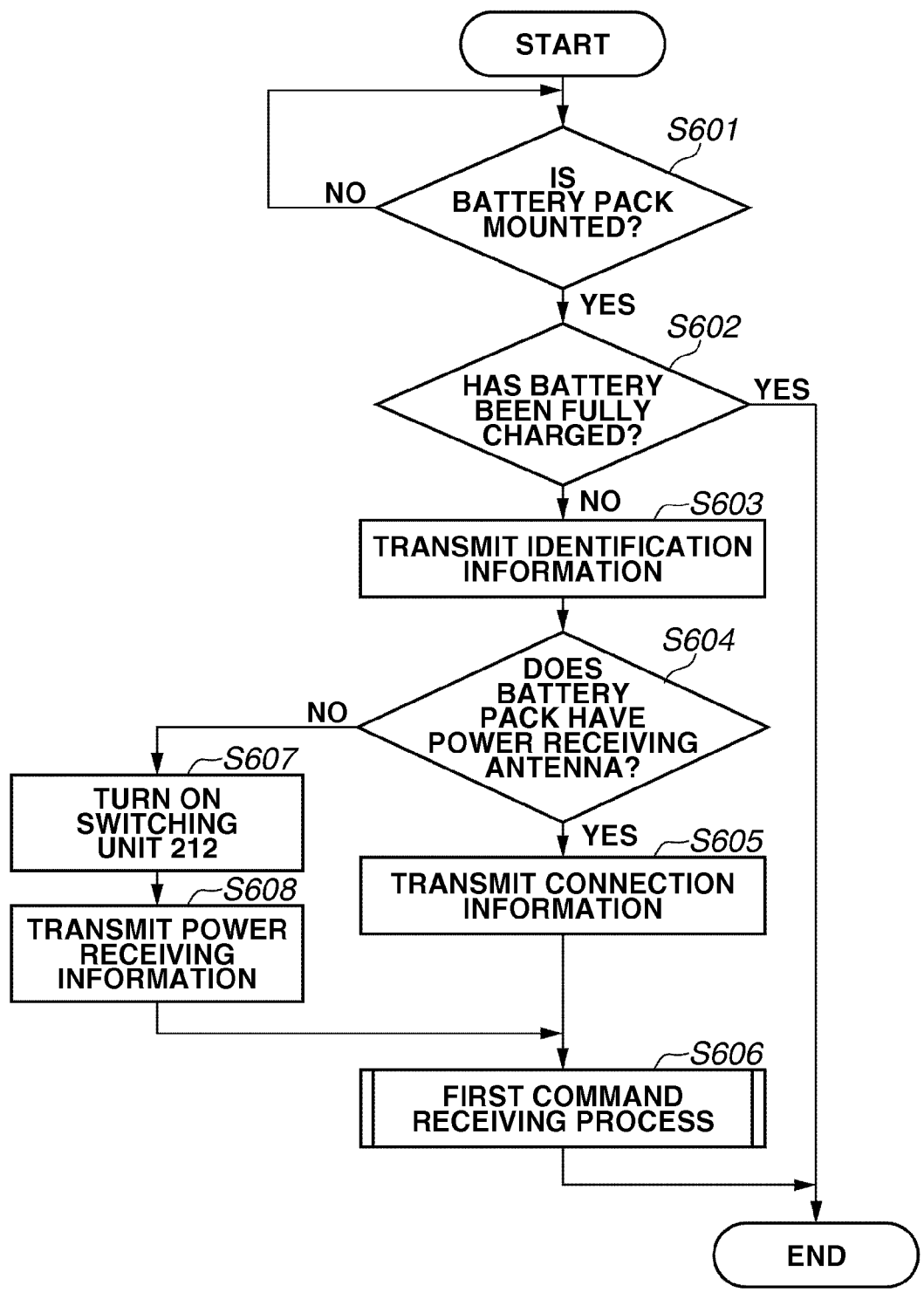

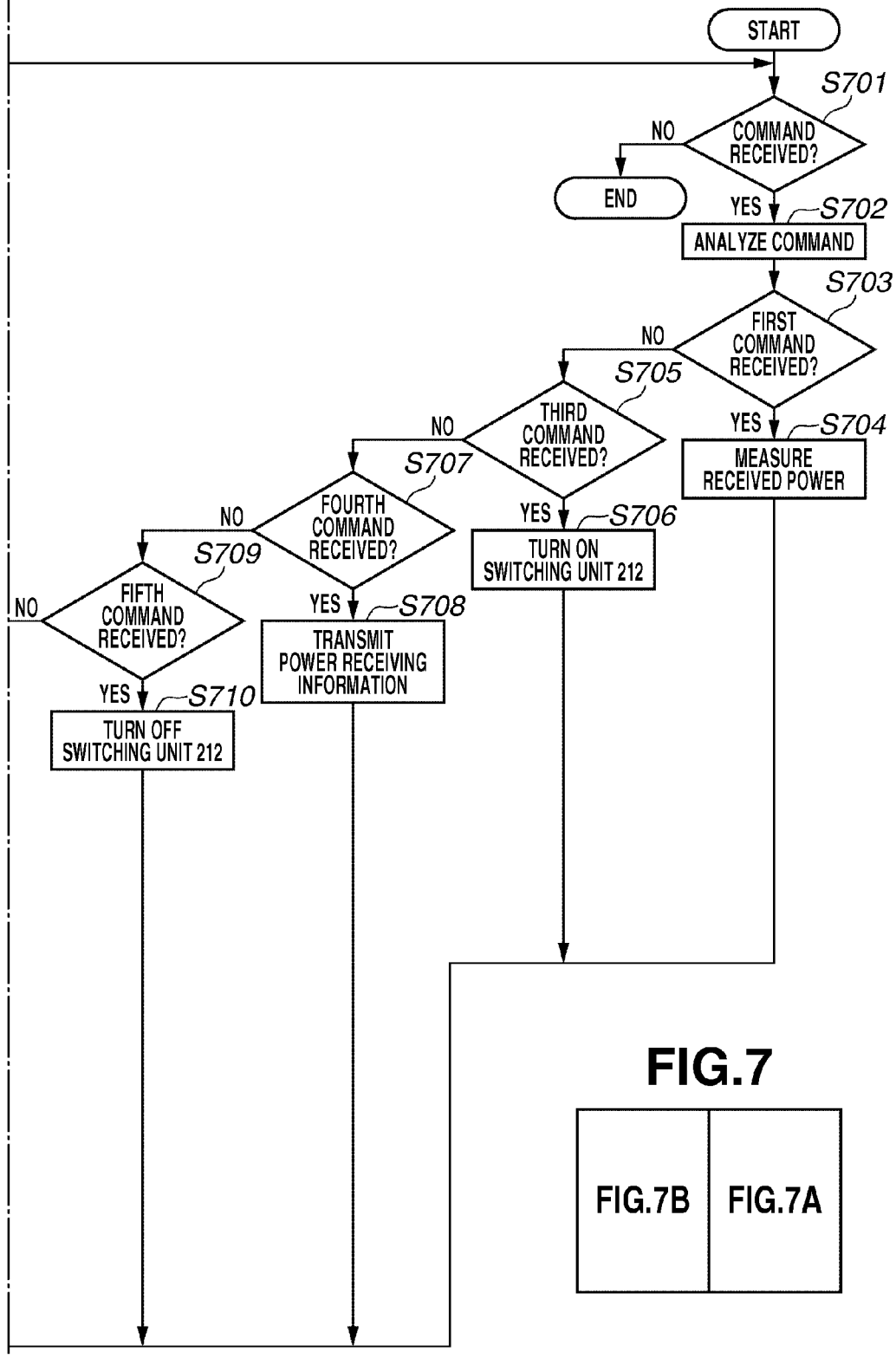

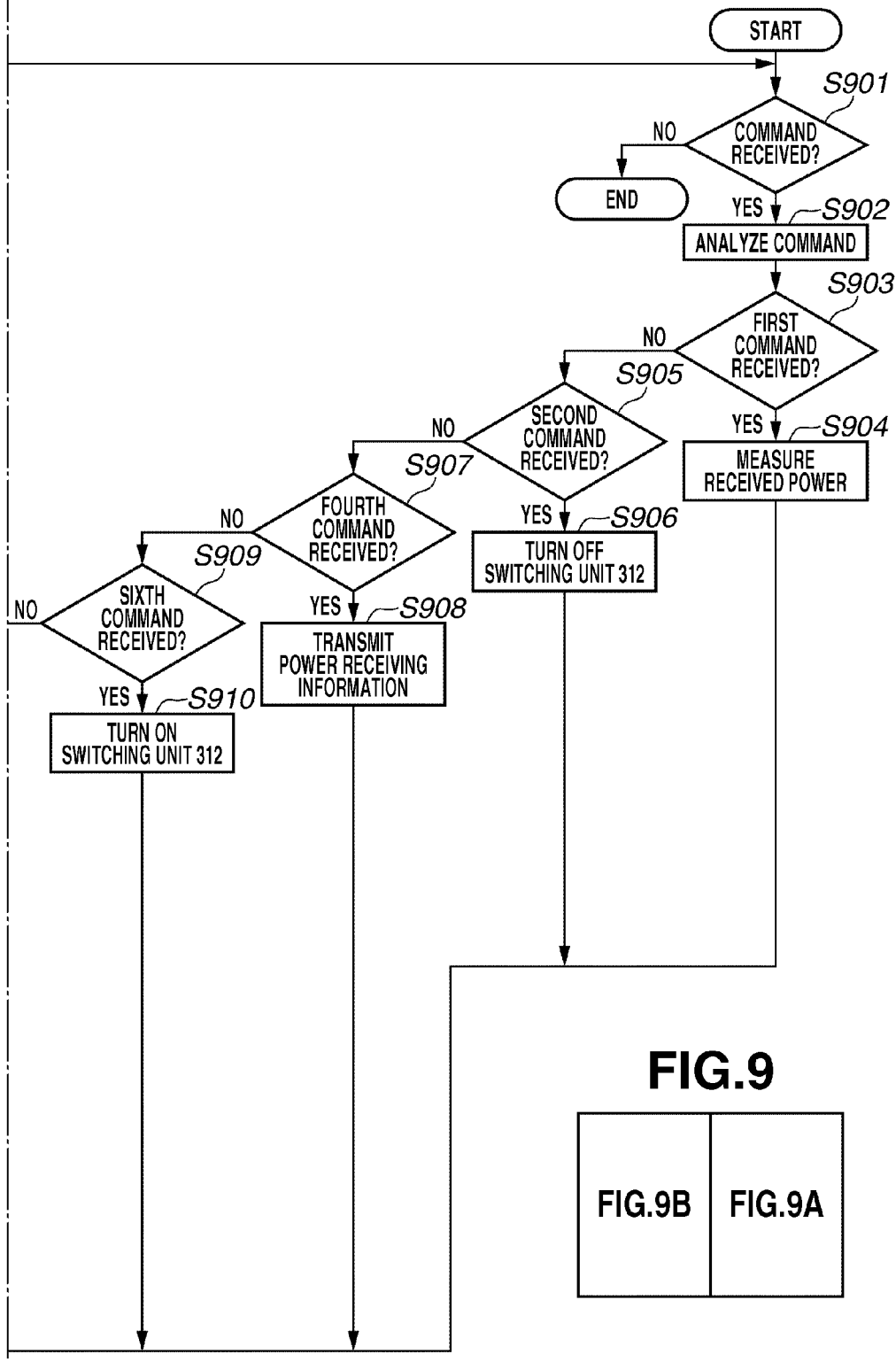

POWER SUPPLY APPARATUS, BATTERY PACK, METHOD, AND STORAGE MEDIUM

BACKGROUND OF THE INVENTION

1. Field of the Invention

The present invention relates to a power supply apparatus, a battery pack, a method, and a storage medium.

2. Description of the Related Art

In recent years, a conventional charging system has been used, which includes a power supply apparatus including a primary coil used for wirelessly supplying power without using a connector and a battery pack including a secondary coil used for wirelessly receiving power supplied from the power supply apparatus and which charges a battery with the received power.

Japanese Patent Application Laid-Open No. 10-021968 discusses a method for wirelessly charging a battery within an electronic device by using a battery pack mounted on an electronic device that does not include a component for wirelessly receiving the power from the power supply apparatus. However, if the above-described battery pack is mounted on an electronic device that has a unit that wirelessly receives power from a power supply apparatus, a battery included in the battery pack is charged with both power received by the battery pack and power received by the electronic device.

As described above, in a conventional system including an electronic device and a battery pack having a component for wirelessly receiving power from a power supply apparatus, power for charging is supplied from the electronic device and the battery pack to the battery. If the power for charging is supplied from the electronic device and the battery pack to the battery, the sum total of a current supplied from the battery pack to the battery and a current supplied from the electronic device to the battery is supplied to the battery.

In this case, for example, if the sum total of the current supplied from the battery pack to the battery and the current supplied from the electronic device to the battery exceeds a maximum value of the current for charging the battery, an overcurrent or an overvoltage may be supplied to the battery.

SUMMARY OF THE INVENTION

The present invention is directed to a power supply apparatus and a charging system capable of executing charge control for preventing an overcurrent to be supplied to a battery pack.

According to an aspect of the present invention, a power supply apparatus includes a power supply unit that wirelessly supplies power to an electronic device including a first unit that wirelessly receives power from the power supply apparatus, and a control unit that executes control, if an external apparatus, including a battery, and the electronic device are connected, to select the first unit to charge the battery by using the first unit.

According to another aspect of the present invention, there is provided a method for controlling a power supply apparatus including a power supply unit that wirelessly supplies power to an electronic device including a first unit that wirelessly receives power from the power supply apparatus. The method includes executing control, if an external apparatus, including a battery, and the electronic device are connected, to select the first unit to charge the battery by using the first unit.

According to yet another aspect of the present invention, there is provided a computer-readable storage medium storing a program executed by a computer, wherein the program for using the computer to perform a method for controlling a power supply apparatus, the power supply apparatus including a power supply unit that wirelessly supplies power to an electronic device including a first unit that wirelessly receives power from the power supply apparatus, the method comprising executing control, if an external apparatus, including a battery, and the electronic device are connected, to select the first unit to charge the battery by using the first unit.

According to yet another aspect of the present invention, a battery pack includes a power receiving unit that wirelessly receives power from a power supply apparatus, and a control unit that supplies information relating to the power receiving unit to the power supply apparatus to cause the power supply apparatus to select a unit that wireless receives power from the power supply apparatus if the battery pack and an electronic device are connected.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 is a flow chart illustrating an example of selection process according to the first exemplary embodiment.

FIG. 6 is a flowchart illustrating an example of first charging process according to the first exemplary embodiment.

DESCRIPTION OF THE EMBODIMENTS

Various exemplary embodiments, features, and aspects of the present invention will now be described in detail below with reference to the attached drawings.

Figure 1:
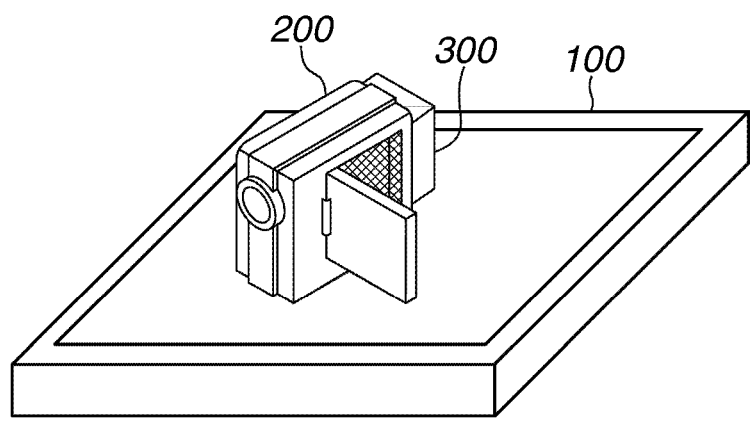
FIG. 1 illustrates an example of a charging system according to a first exemplary embodiment.

Referring to FIG. 1, a charging system according to a first exemplary embodiment of the present invention includes a power supply apparatus 100, an electronic device 200, and a battery pack 300. In the example illustrated in FIG. 1, the electronic device 200, on which the battery pack 300 is mounted, is placed on the power supply apparatus 100.

In the charging system described above, the power supply apparatus 100 wirelessly supplies power to the electronic device 200 via a power supply antenna 108. If the distance between the power supply apparatus 100 and the electronic device 200 is within a predetermined range, the electronic device 200, which includes a power receiving antenna 201, wirelessly receives power supplied from the power supply apparatus 100 via the power receiving antenna 201. In addition, the electronic device 200 charges the battery pack 300, which is mounted on the electronic device 200, with the power received from the power supply apparatus 100 via the power receiving antenna 201.

On the other hand, if the distance between the power supply apparatus 100 and the electronic device 200 is not within the predetermined range, the electronic device 200, even if the electronic device 200 includes a power receiving antenna 201, cannot receive power from the power supply apparatus 100. If the distance between the power supply apparatus 100 and the battery pack 300 is within the predetermined range, the battery pack 300 that includes a power receiving antenna 301 wirelessly receives power supplied from the power supply apparatus 100 via the power receiving antenna 301.

In addition, the battery pack 300 having the power receiving antenna 301 can wirelessly charge the battery 311 with the power received from the power supply apparatus 100 without using the power receiving antenna 201. However, if the distance between the power supply apparatus 100 and the battery pack 300 is not within the predetermined range, the battery pack 300 cannot receive the power from the power supply apparatus 100 even if the battery pack 300 includes the power receiving antenna 301.

Of course, if the battery pack 300 does not have the power receiving antenna 301, the battery pack 300 cannot receive the power transmitted from the power supply apparatus 100. In that case, the electronic device 200 charges a battery 311, which is included in the battery pack 300, according to the power received by the electronic device 200 from the power supply apparatus 100.

In the present exemplary embodiment, the above-described "predetermined range" refers to a range in which the electronic device 200 or the battery pack 300 can communicate with the power supply apparatus 100. The power supply apparatus 100 can wirelessly and simultaneously supply the power to a plurality of electronic devices.

The electronic device 200 is a battery operable apparatus operable with the power supplied from the battery 311 and may be for example an image capture apparatus, such as a digital still camera, a cellular phone with a camera, or a digital video camera, or a reproduction apparatus that reproduces audio data or video data, such as an audio player or a video player. In addition, a mobile apparatus driven by the power supplied from the battery 311, such as a vehicle and more particularly an automobile, can be used as the electronic device 200. Furthermore, any apparatus that includes a battery 311 and can be connected to the electronic device 200, such as an accessory apparatus or a peripheral apparatus, can be used as the battery pack 300.

Figure 2:
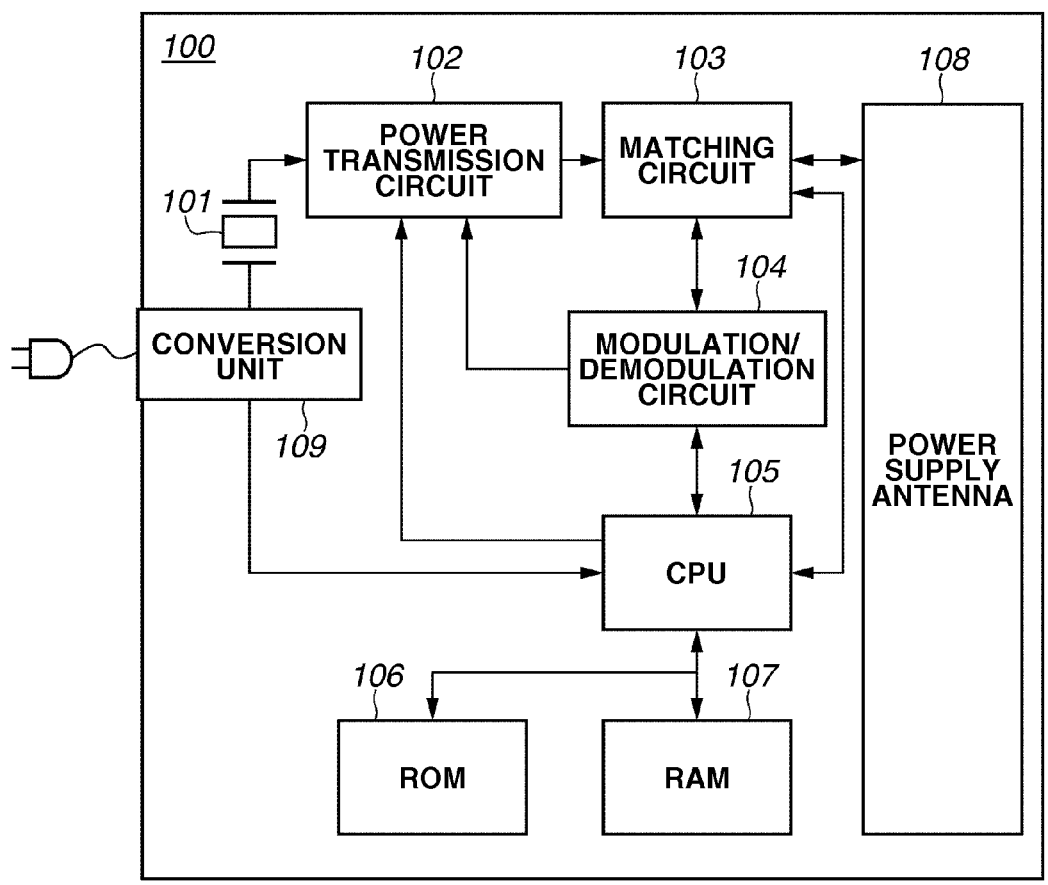
FIG. 2 is a block diagram illustrating an example of a power supply apparatus according to the first exemplary embodiment.

Referring to FIG. 2, the power supply apparatus 100 includes an oscillator 101, a power transmission circuit 102, a matching circuit 103, a modulation and demodulation circuit 104, a central processing unit (CPU) 105, a read-only memory (ROM) 106, a random access memory (RAM) 107, the power supply antenna 108, and a conversion unit 109.

The conversion unit 109 converts an AC power supplied by the AC power source (not illustrated) into a DC power. The oscillator 101 oscillates at a high frequency used for converting the direct current (DC) power, generated by the conversion unit 109, into a power corresponding to a target value determined by the CPU 105 and for supplying the converted power to the electronic device 200. The oscillator 101 is constituted by a crystal oscillator.

The power transmission circuit 102 generates power to be supplied to the electronic device 200 and the battery pack 300 via the power supply antenna 108 according to the frequency of oscillation by the oscillator 101. The power transmission circuit 102 includes a field effect transistor (FET). In addition, the power transmission circuit 102 generates power to be supplied to the electronic device 200 and the battery pack 300 by controlling a current flowing between a source terminal and a drain terminal of the FET according to the frequency of the oscillation by the oscillator 101. The power generated by the power transmission circuit 102 is supplied to the matching circuit 103.

The matching circuit 103 is a resonance circuit for generating a resonance between the power supply antenna 108 and either one of the power receiving antenna 201 and the power receiving antenna 301 according to the frequency of the oscillation by the oscillator 101. The matching circuit 103 includes a variable capacitor, a variable impedance, and a variable resistor. In addition, the matching circuit 103 matches impedance between the power transmission circuit 102 and the power supply antenna 108.

The CPU 105 controls the values of the variable capacitor, the variable impedance, and the variable resistor of the matching circuit 103 to adjust the frequency of oscillation by the oscillator 101 to a resonance frequency f. The resonance frequency f is a frequency of the resonance between the power supply antenna 108 and at least one of the power receiving antenna 201 and the power receiving antenna 301. In addition, the matching circuit 103 can detect a change of current flowing to the power supply antenna 108 and a change of the voltage supplied to the power supply antenna 108.

The modulation and demodulation circuit 104 modulates the power generated by the power transmission circuit 102 according to a predetermined protocol to transmit a command for controlling the electronic device 200 and the battery pack 300 to the electronic device 200 and the battery pack 300. In the present exemplary embodiment, the "predetermined protocol" is a communication protocol used for radio frequency identification (RFID), for example in accordance with International Organization for Standardization (ISO)14443 or ISO15693.

The power generated by the power transmission circuit 102 is converted by the modulation and demodulation circuit 104 into a pulse signal as a command for communication with the electronic device 200 and the battery pack 300. The converted pulse signal is then transmitted to the electronic device 200 and the battery pack 300.

The pulse signal transmitted to the electronic device 200 is recognized as bit data including information "1" and information "0" by an analysis executed by the electronic device 200. The command includes identification information for identifying an address of the destination of the command and command codes, which describes an operation instructed by the command. Furthermore, the CPU 105 controls the modulation and demodulation circuit 104 to change the identification information included in the command. Accordingly, the CPU 105 can execute control for transmitting the command only to the electronic device 200 or the battery pack 300.

The modulation and demodulation circuit 104 converts the power generated by the power transmission circuit 102 into a pulse signal by executing an amplitude shift keying (ASK) modulation using amplitude displacement. The ASK modulation is often used for a communication between an integrated circuit (IC) card and an IC card reader.

The modulation and demodulation circuit 104 converts the power generated by the power transmission circuit 102 into a pulse signal by changing the amplitude of the power generated by the power transmission circuit 102 by switching an analog multiplier and a load resistor included in the modulation and demodulation circuit 104. In addition, the modulation and demodulation circuit 104 includes a coding circuit that executes coding by a predetermined coding format. Furthermore, the modulation and demodulation circuit 104 receives and demodulates information and a command transmitted from the electronic device 200 and the battery pack 300.

If the power for a communication from the power supply apparatus 100 has been supplied to the electronic device 200, the electronic device 200 changes the load on the apparatus in relation to the power supplied from the power supply apparatus 100. By executing the above-described process, the electronic device 200 transmits predetermined information and a command, which are generated according to a load modulation method, to the power supply apparatus 100.

Accordingly, in receiving the predetermined information and the command from the electronic device 200, the modulation and demodulation circuit 104 demodulates the predetermined information and the command according to a change of the current flowing to the power supply antenna 108, which is detected by the matching circuit 103, and supplies the information and the command to the CPU 105. In addition, in receiving information and a command generated according to a load modulation method from the battery pack 300, the modulation and demodulation circuit 104 executes an operation similar to an operation executed when the modulation and demodulation circuit 104 receives the information and the command generated according to the load modulation method from the electronic device 200.

If the AC power source (not illustrated) and the power supply apparatus 100 are connected with each other, the CPU 105 controls the power supply apparatus 100 by using a DC power supplied from the AC power source (not illustrated) via the conversion unit 109. In addition, the CPU 105 controls an operation of the power supply apparatus 100 by executing a computer program stored on the ROM 106.

The CPU 105 controls the power transmission circuit 102 to control the power to be supplied to the electronic device 200 and the battery pack 300. In addition, the CPU 105 controls the modulation and demodulation circuit 104 to transmit a command to the electronic device 200.

Furthermore, the CPU 105 controls the matching circuit 103 to control the power supply apparatus 100 to generate a resonation with the electronic device 200 and the battery pack 300. More specifically, the CPU 105 controls the frequency of the oscillation by the oscillator 101 so that the frequency of the oscillation is equal to the resonance frequency f and controls the matching circuit 103 so that the resonance frequency f of the power supply apparatus 100 is equal to the resonance frequency of the electronic device 200 and the resonance frequency of the battery pack 300. In addition, the CPU 105 includes a timer (not illustrated), which is configured to measure time for an operation of and processing by the power supply apparatus 100.

The ROM 106 stores a computer program for controlling the operation of the power supply apparatus 100. In addition, the ROM 106 stores information, such as a parameter for the operation of the power supply apparatus 100. The RAM 107 is a rewritable non-volatile memory that temporarily stores the computer program for controlling an operation of the components of the power supply apparatus 100, the information about the operation of the power supply apparatus 100, such as a parameter, and the information received by using the modulation and demodulation circuit 104 from the electronic device 200.

The power supply antenna 108 outputs the power generated by the power transmission circuit 102 to the electronic device 200 and the battery pack 300. The power supply apparatus 100 transmits power and a command to the electronic device 200 and the battery pack 300 via the power supply antenna 108. In addition, the power supply apparatus 100 receives a command and a response signal from the electronic device 200 and the battery pack 300 via the power supply antenna 108.

If the AC power source (not illustrated) is connected, the conversion unit 109 converts an AC power supplied by the AC power source (not illustrated) into a DC power. In addition, the conversion unit 109 supplies the converted DC power to the power supply apparatus 100.

Now, the electronic device 200 will be described in detail below with reference to FIG. 3. In the present exemplary embodiment, a digital still camera will be described as an example of the electronic device 200 with reference to FIG. 3.

Figure 3:
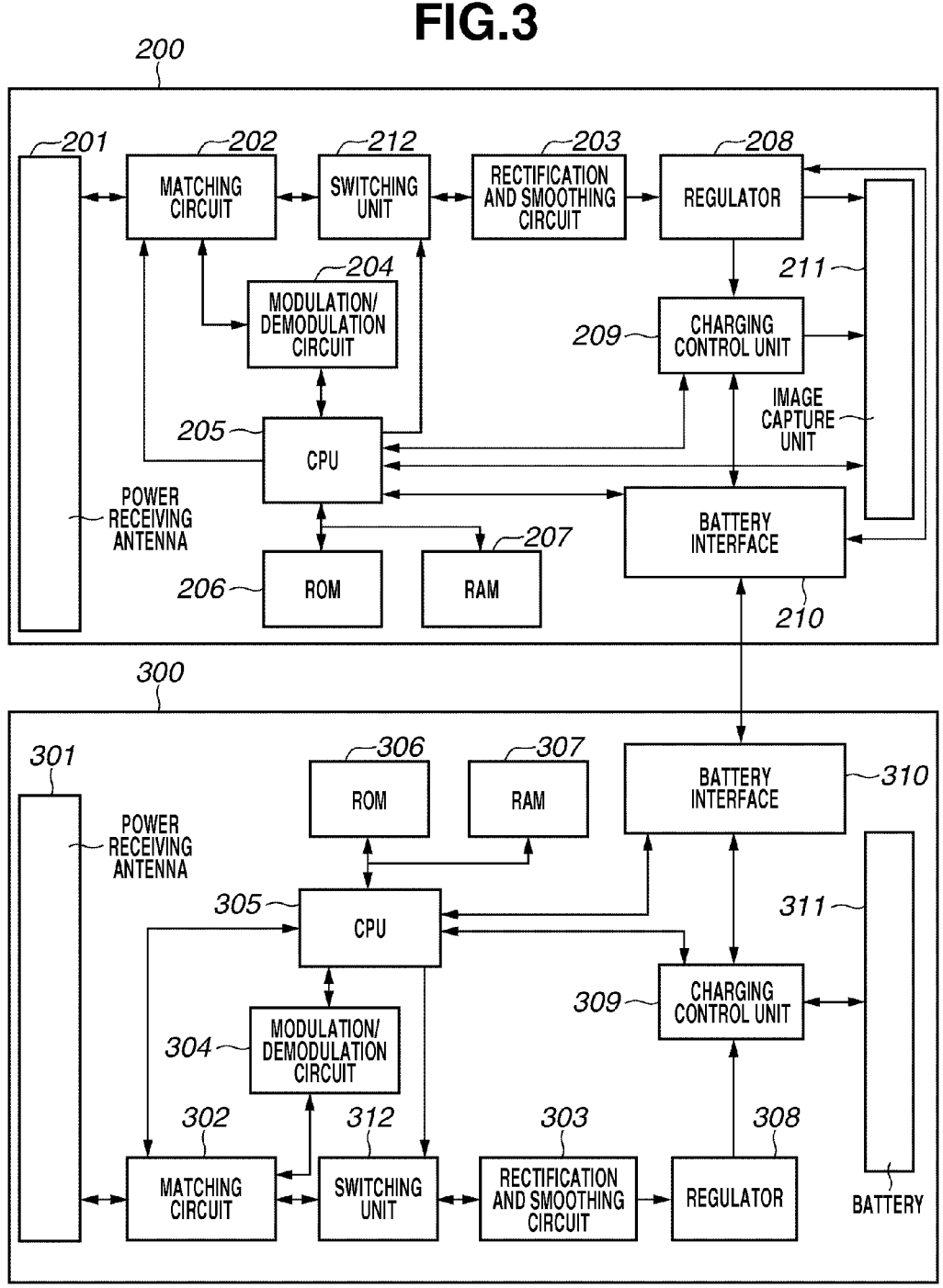
FIG. 3 is a block diagram illustrating an example of an electronic device and a battery pack according to the first exemplary embodiment.

Referring to FIG. 3, the electronic device 200 includes the power receiving antenna 201, a matching circuit 202, a rectification and smoothing circuit 203, a modulation and demodulation circuit 204, a CPU 205, a ROM 206, a RAM 207, a regulator 208, a charging control unit 209, a battery interface 210, an image capture unit 211, and a switching unit 212.

The power receiving antenna 201 is an antenna for receiving the power supplied from the power supply apparatus 100. In addition, the electronic device 200 receives the power and a command from the power supply apparatus 100 via the power receiving antenna 201. Furthermore, the electronic device 200 transmits a command and a response signal from the electronic device 200 via the power receiving antenna 201.

The matching circuit 202 is a resonance circuit for matching the impedance to generate a resonance between the power supply apparatus 100 and the power receiving antenna 201 at the same frequency as the resonance frequency f of the power supply apparatus 100. The matching circuit 202 includes a variable capacitor, a variable impedance, and a variable resistor. The CPU 205 controls values of the variable capacitor, the variable impedance, and the variable resistor of the matching circuit 202 to generate the resonance between the power supply apparatus 100 and the power receiving antenna 201 at the same frequency as the resonance frequency f of the power supply apparatus 100.

In addition, the matching circuit 202 receives power that has been received by the power receiving antenna 201 and supplied from the power receiving antenna 201 via the switching unit 212. In addition, the matching circuit 202 supplies the received power to the rectification and smoothing circuit 203.

The rectification and smoothing circuit 203 eliminates the command and a noise from the power received by the power receiving antenna 201 and generate a DC power used for charging the battery 311. In addition, the rectification and smoothing circuit 203 supplies the generated DC power to the regulator 208.

Moreover, the rectification and smoothing circuit 203 supplies the command that has been eliminated from the power received by the power receiving antenna 201 to the modulation and demodulation circuit 204. The rectification and smoothing circuit 203 includes a rectification diode and generates the DC power by using either one of full-wave rectification and half-wave rectification.

The modulation and demodulation circuit 204 analyzes the command supplied from the rectification and smoothing circuit 203 according to a predetermined communication protocol used for the communication with the power supply apparatus 100. In addition, the modulation and demodulation circuit 204 transmits a result of the analysis on the command to the CPU 205.

If the power for the communication between the power supply apparatus 100 and the electronic device 200 has been supplied from the power supply apparatus 100 to the electronic device 200, the CPU 205 controls the modulation and demodulation circuit 204 to cause the load included in the modulation and demodulation circuit 204 to vary to transmit a command and predetermined information to the power supply apparatus 100.

If the load existing in the modulation and demodulation circuit 204 changes, then the current supplied to the power supply antenna 108 changes. Accordingly, the power supply apparatus 100 receives the predetermined information and the command by detecting the change of the current supplied to the power supply antenna 108.

The CPU 205 determines the type of the received command according to the analysis result supplied from the modulation and demodulation circuit 204. In addition, the CPU 205 controls the electronic device 200 to execute an operation indicated by command codes corresponding to the received command. Furthermore, the CPU 205 executes a computer program stored on the ROM 206 to control an operation of the electronic device 200.

The ROM 206 stores the computer program for controlling the operation of the electronic device 200. In addition, the ROM 206 stores information about the operation of the electronic device 200, such as a parameter. Furthermore, identification information and power receiving information about the electronic device 200 are store in the ROM 206. The identification information about the electronic device 200 includes an ID, the name of the manufacturer, the apparatus name, and the date of manufacture of the electronic device 200.

The power receiving information about the electronic device 200 includes information about the power that the power receiving antenna 201 can receive, a value of the current to be supplied from the electronic device 200 to the battery 311 in charging the battery 311, and a value of the voltage to be supplied from the electronic device 200 to the battery 311 in charging the battery 311.

The value of the current to be supplied to the battery 311 in charging the battery 311, which is included in the power receiving information about the electronic device 200, refers to a value of the current supplied to the battery 311 in charging the battery 311 with the power received by the power receiving antenna 201. Furthermore, the value of the voltage to be supplied to the battery 311 in charging the battery 311, which is included in the power receiving information about the electronic device 200, refers to a value of the voltage to be supplied to the battery 311 in charging the battery 311 with the power received by the power receiving antenna 201.

In addition, the power receiving information about the electronic device 200 can include efficiency information and area information. The efficiency information is information about how high power received by the power receiving antenna 201 can be in relation to the power supplied from the power supply apparatus 100. The area information is information about the area of the power receiving antenna 201.

The RAM 207 is a rewritable non-volatile memory. The RAM 207 temporarily stores a computer program for controlling an operation of the electronic device 200, information about the operation of the electronic device 200, such as a parameter, information received from the power supply apparatus 100, and information acquired from the battery pack 300.

The regulator 208 controls the voltage of the DC power supplied from the rectification and smoothing circuit 203 so that the voltage of the DC power is equal to a voltage value set by the CPU 205. The regulator 208 can be either a switching regulator or a linear regulator. The DC power controlled so that voltage of the DC power is equal to the voltage value set by the CPU 205, which is supplied from the rectification and smoothing circuit 203 via the regulator 208, is supplied to the charging control unit 209.

In addition, the regulator 208 controls the voltage of the power supplied from the battery 311 so that the voltage of the power supplied from the battery 311 is equal to a voltage value set by the CPU 205. The DC power controlled so that the voltage of the power supplied from the battery 311 is equal to the voltage value set by the CPU 205, which is supplied from the battery 311 via the regulator 208, is supplied to the CPU 205, the ROM 206, the RAM 207, and the image capture unit 211 of the electronic device 200.

If the battery pack 300 is mounted on the electronic device 200 and if the DC power is supplied from the regulator 208 to the charging control unit 209, then the charging control unit 209 charges the battery 311. The charging control unit 209 charges the battery 311 by a constant voltage/constant current (CV/CC) method.

In addition, the charging control unit 209 detects remaining capacity information about the battery 311 of the battery pack 300 that is mounted on the electronic device 200. In addition, the charging control unit 209 supplies the detected remaining capacity information about the battery 311 to the CPU 205.

The CPU 205 records the information about the remaining capacity of (the remaining capacity information about) the battery 311, which has been supplied from the charging control unit 209, on the RAM 207. In charging the battery 311, the charging control unit 209 detects the current and the voltage to be supplied to the battery 311 and supplies the detected information to the CPU 205.

The CPU 205 records the information about the current to be supplied to the battery 311 and the information about the voltage to be supplied to the battery 311, which have been supplied by the charging control unit 209, on the RAM 207. The charging control unit 209 can detect the remaining capacity information about the battery 311 by acquiring remaining capacity information about the battery 311 detected by the battery pack 300. Alternatively, the charging control unit 209 can calculate the remaining capacity information about the battery 311 based on the current supplied to the battery 311 and the voltage supplied to the battery 311.

The battery interface 210 is an interface for a communication with the battery pack 300 detachably mounted on the electronic device 200. The battery interface 210 can communicate with the battery pack 300 either by wired communication or wireless communication. The battery interface 210 supplies the power received from the power supply apparatus 100 to the battery pack 300 according to an instruction from the CPU 205. In addition, the battery interface 210 supplies the power received from the battery pack 300 to the image capture unit 211 via the regulator 208.

If an instruction for controlling the battery pack 300 has been input by the CPU 205, the instruction for controlling the battery pack 300 is supplied to a CPU 305 via the battery interface 210. In addition, if an instruction for controlling the electronic device 200 has been input by the CPU 305, then the instruction for controlling the electronic device 200 is supplied to the CPU 205 via the battery interface 210.

The image capture unit 211 includes an image sensor, an image processing circuit, and a compression/decompression circuit. The image sensor generates video data based on an optical image of an object. The image processing circuit executes image processing on the video data generated by the image sensor. The compression/decompression circuit compresses the video data and decompresses compressed video data.

The image capture unit 211 shoots video data of the object. In addition, the image capture unit 211 records the video data, such as a still image or moving image taken as a result of the shooting, on a recording medium (not illustrated). An external recording medium that can be detachably mounted on the electronic device 200 can be used as the recording medium (not illustrated). Alternatively, the recording medium (not illustrated) can be built in to the electronic device 200. The switching unit 212 is a switch for connecting between the matching circuit 202 and the rectification and smoothing circuit 203.

The CPU 205 executes control for connecting between the matching circuit 202 and the rectification and smoothing circuit 203 by turning on the switching unit 212. In addition, the CPU 205 executes control for disconnecting between the matching circuit 202 and the rectification and smoothing circuit 203 by turning off the switching unit 212.

The switching unit 212 can be a relay switch. Alternatively, a switch previously provided to the matching circuit 202 of the electronic device 200 can be utilized as the switching unit 212. If the switching unit 212 has been turned on, the electronic device 200 can receive the power and the command supplied from the power supply apparatus 100 via the power receiving antenna 201. In addition, in this case, the electronic device 200 can transmit the command to the power supply apparatus 100 via the power receiving antenna 201.

If the switching unit 212 has been turned off, the electronic device 200 cannot receive the power supplied from the power supply apparatus 100. However, in this case, the electronic device 200 can receive the command transmitted from the power supply apparatus 100 via the power receiving antenna 201 and can transmit the command to the power supply apparatus 100.

Referring to FIG. 3, the battery pack 300 includes the power receiving antenna 301, a matching circuit 302, a rectification and smoothing circuit 303, a modulation and demodulation circuit 304, a CPU 305, a ROM 306, a RAM 307, a regulator 308, a charging control unit 309, a battery interface 310, and the battery 311.

The battery pack 300 can be detachably mounted on the electronic device 200. If the battery pack 300 has been mounted on the electronic device 200, the battery interface 210 of the electronic device 200 is connected to the battery interface 310 of the battery pack 300.

The power receiving antenna 301, the matching circuit 302, the rectification and smoothing circuit 303, and the modulation and demodulation circuit 304 of the battery pack 300 include the same function as the function of and execute the same operation as the operation of the power receiving antenna 201, the matching circuit 202, the rectification and smoothing circuit 203, and the modulation and demodulation circuit 204, respectively.

The CPU 305, the ROM 306, the RAM 307, the regulator 308, and the charging control unit 309 of the battery pack 300 include the same functions as the functions of and execute the same operations as the operations of the CPU 205, the ROM 206, the RAM 207, the regulator 208, and the charging control unit 209, respectively.

The CPU 305 determines the type of the received command according to a result of an analysis, which is supplied from the modulation and demodulation circuit 304. In addition, the CPU 305 controls the battery pack 300 to execute an operation indicated by command codes corresponding to the received command.

Furthermore, the CPU 305 controls the operation of the battery pack 300 by executing a computer program stored on the ROM 306. If an instruction for controlling the battery pack 300 has been input by the electronic device 200 via the battery interface 310, then the CPU 305 analyzes the instruction for controlling the battery pack 300 and controls the battery pack 300 according to a result of the analysis.

The ROM 306 stores the computer program for controlling the operation of the battery pack 300 and information about the operation of the battery pack 300, such as a parameter. In addition, the ROM 306 records identification information about the battery pack 300, power receiving information about the battery pack 300, charging information about the battery 311, and information indicating that the battery pack 300 includes the power receiving antenna 301.

For example, the identification information about the battery pack 300 includes the ID, the name of the manufacturer, the apparatus name, and the date of manufacture of the battery pack 300. The power receiving information about the battery pack 300 includes information about the power that the power receiving antenna 301 can receive, a value of the current to be supplied to the battery 311 in charging the battery 311, and a value of the voltage to be supplied to the battery 311 in charging the battery 311.

In addition, the power receiving information about the battery pack 300 can include efficiency information and area information. The efficiency information is information about how high power received by the power receiving antenna 301 can be in relation to the power supplied from the power supply apparatus 100. The area information is information about the area of the power receiving antenna 301.

The value of the current to be supplied to the battery 311 in charging the battery 311, which is included in the power receiving information about the battery pack 300, refers to a value of the current supplied to the battery 311 in charging the battery 311 with the power received by the power receiving antenna 301. Furthermore, the value of the voltage to be supplied to the battery 311 in charging the battery 311, which is included in the power receiving information about the battery pack 300, refers to a value of the voltage to be supplied to the battery 311 in charging the battery 311 with the power received by the power receiving antenna 301.

The charging information about the battery 311 includes a permissible current value and a permissible voltage value. The permissible current value is a threshold value of the current permitted for charging the battery 311. The permissible voltage value is a threshold value of the voltage permitted for charging the battery 311. The charging control unit 309 charges the battery 311 by the constant voltage/constant current method.

The battery interface 310 supplies the power received from the power supply apparatus 100 via the power receiving antenna 301 to the battery 311 and supplies the power received from the battery 311 to the electronic device 200 according to an instruction input by the CPU 305. In addition, if an instruction for controlling the battery pack 300 has been input by the electronic device 200, the instruction for controlling the battery pack 300 is supplied to the CPU 305 via the battery interface 310.

Furthermore, if the instruction for controlling the electronic device 200 has been input by the CPU 305, the instruction for controlling the electronic device 200 is supplied to the electronic device 200 via the battery interface 310.

The battery 311 is a battery that can be detachably mounted on the electronic device 200. In addition, the battery 311 is a secondary battery that can be charged. For example, a lithium ion (Li) battery can be used as the battery 311.

A switching unit 312 is a switch for connecting between the matching circuit 302 and the rectification and smoothing circuit 303. The CPU 305 executes control for connecting between the matching circuit 302 and the rectification and smoothing circuit 303 by turning on the switching unit 312. In addition, the CPU 305 executes control for disconnecting between the matching circuit 302 and the rectification and smoothing circuit 303 by turning off the switching unit 312.

The switching unit 312 can be a relay switch. Alternatively, a switch previously provided to the matching circuit 302 of the battery pack 300 can be utilized as the switching unit 312. If the switching unit 312 has been turned on, the battery pack 300 can receive the power and the command supplied from the power supply apparatus 100 via the power receiving antenna 301. On the other hand, if the switching unit 312 has been turned off, the battery pack 300 cannot receive the power supplied from the power supply apparatus 100. However, in this case, the battery pack 300 can receive the command transmitted from the power supply apparatus 100 via the power receiving antenna 301.

In the charging system according to the present exemplary embodiment, the power supply apparatus 100 can supply power to the electronic device 200 and the battery pack 300 by electromagnetic induction and the electronic device 200 and the battery pack 300 can receive the power from the power supply apparatus 100 by electromagnetic induction.

Alternatively, in the charging system according to the present exemplary embodiment, the power supply apparatus 100 can supply power to the electronic device 200 and the battery pack 300 by magnetic field resonance and the electronic device 200 and the battery pack 300 can receive the power from the power supply apparatus 100 by magnetic field resonance.

Further alternatively, in the charging system according to the present exemplary embodiment, the power supply apparatus 100 can supply power to the electronic device 200 and the battery pack 300 by electric field resonance and the electronic device 200 and the battery pack 300 can receive the power from the power supply apparatus 100 by electric field resonance.

A helical antenna, a loop antenna, or a flat-shaped antenna, such as a meander line antenna, can be used as the power supply antenna 108, the power receiving antenna 201, and the power receiving antenna 301. In addition, the present invention can also be implemented by the following system. More specifically, in this case, an electrode is provided to the power supply apparatus 100 instead of the power supply antenna 108 and to the electronic device 200 instead of the power receiving antenna 201. Furthermore, the power supply apparatus 100 wirelessly supplies power to the electronic device 200.

Further alternatively, the present invention can also be implemented by the following system. In this case, in the system, an electrode is provided to the power supply apparatus 100 instead of the power supply antenna 108 and another electrode is provided to the battery pack 300 instead of the power receiving antenna 301. Furthermore, the power supply apparatus 100 wirelessly supplies power to the battery pack 300.

Yet further alternatively, the present invention can be implemented by a system in which the power supply apparatus 100 wirelessly supplies power to the electronic device 200 and the battery pack 300 by electric field coupling.

In the present exemplary embodiment, the power supply apparatus 100 wirelessly supplies power to the electronic device 200 and the battery pack 300, and the electronic device 200 and the battery pack 300 wirelessly receive the power from the power supply apparatus 100. However, the term "wirelessly" can be translated as "contactlessly" or "by a non-contact transmission".

Now, power supply process according to the present exemplary embodiment, which is executed by the power supply apparatus 100, will be described in detail below with reference to the flow chart of FIG. 4. The power supply process may be realized by the CPU 105 executing the computer program from the ROM 106. The power supply process illustrated in FIG. 4 is executed by the power supply apparatus 100 when the power supply apparatus 100 is in a power supply mode.

In executing the power supply process under control of the CPU 105, it is supposed that the predetermined power for the communication between the power supply apparatus 100 and the electronic device 200 and between the power supply apparatus 100 and the battery pack 300 is always and continuously supplied from the power supply apparatus 100 to the electronic device 200 and the battery pack 300.

Figure 4:
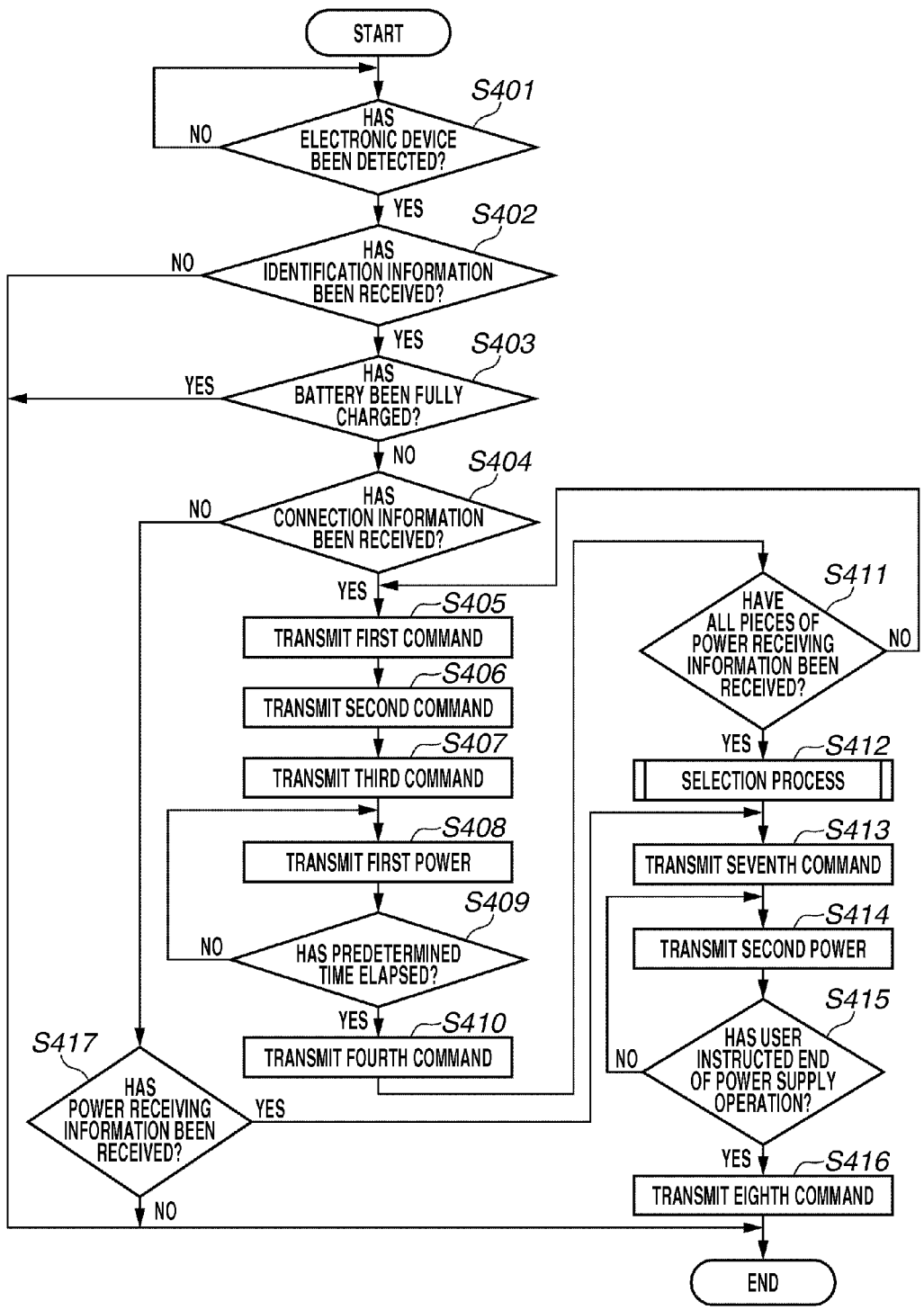
FIG. 4 is a flow chart illustrating an example of power supply process according to the first exemplary embodiment.

Referring to FIG. 4, in step S401, the CPU 105 detects whether at least one of the electronic device 200 and the battery pack 300 exists in the range in which the electronic device 200 can receive power from the power supply apparatus 100 according to a change of the current supplied to the power supply antenna 108, which is detected by the matching circuit 103.

If it is determined that the electronic device 200 and the battery pack 300 do not exist in the range in which the electronic device 200 can receive power from the power supply apparatus 100 (NO in step S401), then the CPU 105 repeats the process in step S401. On the other hand, if it is determined that at least one of the electronic device 200 and the battery pack 300 exists in the range in which the electronic device 200 can receive power from the power supply apparatus 100 (YES in step S401), then the process advances from step S401 to step S402.

In step S402, the CPU 105 determines whether the modulation and demodulation circuit 104 has received the identification information about the electronic device 200, which has been detected in step S401, from the electronic device 200. In addition, in step S402, the CPU 105 determines whether the modulation and demodulation circuit 104 has received the identification information about the battery pack 300, which has been detected in step S401, from the battery pack 300.

If it is determined that the modulation and demodulation circuit 104 has received the identification information about the electronic device 200 (YES in step S402), then the CPU 105 acquires the identification information about the electronic device 200 from the electronic device 200 and records the acquired the identification information about the electronic device 200 on the RAM 107.

If it is determined that the modulation and demodulation circuit 104 has received the identification information about the battery pack 300 (YES in step S402), then the CPU 105 acquires the identification information about the battery pack 300 from the battery pack 300 and records the acquired the identification information about the battery pack 300 on the RAM 107.

If the identification information about the electronic device 200 and the identification information about the battery pack 300 have been received by the modulation and demodulation circuit 104 (YES in step S402), the CPU 105 records the identification information on the RAM 107 separately from each other. In this case (YES in step S402), then the process advances from step S402 to step S403.

If it is determined that the identification information about the electronic device 200 and the identification information about the battery pack 300 have not been received by the modulation and demodulation circuit 104 (NO in step S402), then the process ends.

In step S403, the CPU 105 determines whether the battery 311 has been fully charged. More specifically, in step S403, the CPU 105 acquires the remaining capacity information about the battery 311 from one of the electronic device 200 and the battery pack 300. The CPU 105 determines whether the battery 311 has been fully charged according to the acquired remaining capacity information about the battery 311.

If it is determined that the battery 311 has been fully charged (YES in step S403), then the process ends. On the other hand, if it is determined that the battery 311 has not been fully charged (NO in step S403), then the process advances from step S403 to step S404.

In step S404, the CPU 105 determines whether the modulation and demodulation circuit 104 has received connection information from the electronic device 200. If it is determined that the modulation and demodulation circuit 104 has not received the connection information transmitted from the electronic device 200 (NO in step S404), then the process advances from step S404 to step S417.

On the other hand, if it is determined that the modulation and demodulation circuit 104 has received the connection information transmitted from the electronic device 200 (YES in step S404), then the process advances from step S404 to step S405. In the present exemplary embodiment, the "connection information" refers to the information indicating that the battery pack including a power receiving antenna is mounted on the electronic device 200.

In addition, the connection information includes information indicating the quantity of the battery packs, having a power receiving antenna, mounted on the electronic device 200, the identification information about the electronic device 200, and the identification information about the battery pack mounted on the electronic device 200 and having a power receiving antenna. The information indicating the quantity of the battery packs, having a power receiving antenna, mounted on the electronic device 200 is quantity information about the number of battery packs, having a power receiving antenna, mounted on the electronic device 200.

Accordingly, the connection information includes the identification information about the battery pack corresponding to the quantity information that indicates the number of the battery packs. In the present exemplary embodiment, if the battery pack 300 is mounted on the electronic device 200, the quantity information included in the connection information has a value "1". In this case, the connection information includes the identification information about the battery pack 300.

On the other hand, if two battery packs are mounted on the electronic device 200 and if both of the two battery packs mounted on the electronic device 200 have a power receiving antenna, the quantity information included in the connection information has a value "2". In this case, the connection information includes the identification information about the two battery packs.

Furthermore, if two battery packs are mounted on the electronic device 200 and if only one of the two battery packs mounted on the electronic device 200 has a power receiving antenna, the quantity information included in the connection information has a value "1". In this case, the connection information does not include the identification information of the battery pack that does not have a power receiving antenna but includes the identification information about the battery pack that has a power receiving antenna.

In the present exemplary embodiment, it is supposed that the quantity information included in the connection information has the value "1" and that the connection information includes the identification information about the battery pack 300.

In step S405, the CPU 105 controls the matching circuit 103 and the modulation and demodulation circuit 104 to transmit a first command to the electronic device 200 and the battery pack 300, respectively. In the present exemplary embodiment, a "first command" is a command for instructing the detection of the power receiving information about the electronic device 200 and the power receiving information about the battery pack 300. Then, the process advances from step S405 to step S406. More specifically, in step S405, the CPU 105 executes control for transmitting the first command to the electronic device, corresponding to the identification information about the electronic device included in the connection information received in step S404, and the battery pack corresponding to the identification information about the battery pack included in the connection information received in step S404.

In step S406, the CPU 105 controls the matching circuit 103 and the modulation and demodulation circuit 104 to transmit a second command to the battery pack 300. In the present exemplary embodiment, a "second command" refers to a command for instructing the battery pack 300 to turn off the switching unit 312 of the battery pack 300. When the second command is transmitted to the battery pack 300, the process advances from step S406 to step S407. In step S406, the CPU 105 executes control for transmitting the second command to the battery pack corresponding to the identification information about the battery pack included in the connection information received in step S404.

In step S407, the CPU 105 controls the matching circuit 103 and the modulation and demodulation circuit 104 to transmit a third command to the electronic device 200. In the present exemplary embodiment, a "third command" refers to a command for instructing the electronic device 200 to turn on the switching unit 212 of the electronic device 200. When the third command is transmitted to the electronic device 200, the process advances from step S407 to step S408. In step S407, the CPU 105 executes control for transmitting the third command to the electronic device corresponding to the identification information about the electronic device included in the connection information received in step S404.

In step S408, the CPU 105 transmits a first power, for detecting the power receiving information about the electronic device 200 and the power receiving information about the battery pack 300, and power information to the electronic device 200 and the battery pack 300 via the power supply antenna 108. The power information refers to information about a value of the power to be transmitted to the electronic device 200 and the battery pack 300. The power information transmitted in step S408 is information about a value of the first power.

In this case, the CPU 105 controls the power transmission circuit 102 and the matching circuit 103 to output the first power to the electronic device 200 and the battery pack 300 via the power supply antenna 108. In addition, the CPU 105 controls the matching circuit 103 and the modulation and demodulation circuit 104 to transmit the power information to the electronic device 200 and the battery pack 300 via the power supply antenna 108. Then, the process advances from step S408 to step S409.

The first power is power higher than predetermined power for the communication with the electronic device 200 and battery pack 300 by a command. The CPU 105 controls the timer (not illustrated) to measure time elapsed since the output of the first power.

In step S409, the CPU 105 determines whether time measured by using the timer (not illustrated) has reached the predetermined time. If it is determined that the time measured by the timer (not illustrated) has reached the predetermined time (YES in step S409), then the process advances from step S409 to step S410. On the other hand, if it is determined that the time measured by the timer (not illustrated) has not reached the predetermined time yet (NO in step S409), then the process returns to step S408.

In step S410, the CPU 105 executes control for stopping the output of the first power to the electronic device 200 and the battery pack 300 via the power supply antenna 108. In addition, the CPU 105 controls the matching circuit 103 and the modulation and demodulation circuit 104 to transmit a fourth command to the electronic device 200 and the battery pack 300. The fourth command is a command for stopping the detection of the power receiving information about the electronic device 200 and the power receiving information about the battery pack 300. Then, the process advances from step S410 to step S411.

In step S411, the CPU 105 determines whether the modulation and demodulation circuit 104 has received all the power receiving information via the power supply antenna 108. If it is determined that the modulation and demodulation circuit 104 has received all the power receiving information via the power supply antenna 108 (YES in step S411), then the process advances from step S411 to step S412. On the other hand, if it is determined that the modulation and demodulation circuit 104 has not received all the power receiving information via the power supply antenna 108 yet (NO in step S411), then the process returns from step S411 to step S405. In this case, the CPU 105 repeats the process from step S405 to step S410 to detect power receiving information.

If the CPU 105 executes the process in step S406, the CPU 105 executes control for transmitting a fifth command, which is a command for instructing the electronic device 200 to turn off the switching unit 212 of the electronic device 200, to the electronic device 200 instead of transmitting the second command thereto. Furthermore, if the CPU 105 executes the process in step S407, the CPU 105 transmits a sixth command, which is a command for instructing the battery pack 300 to turn on the switching unit 312 of the battery pack 300, to the battery pack 300 instead of transmitting the third command thereto.

If the modulation and demodulation circuit 104 has received the identification information (YES in step S402), then in step S411, the CPU 105 can determine whether the modulation and demodulation circuit 104 has received all power receiving information via the power supply antenna 108 according to the number of pieces of the identification information received by the modulation and demodulation circuit 104.

If the number of pieces of the identification information received by the modulation and demodulation circuit 104 and recorded on the RAM 107 is "1", then in step S412, the CPU 105 determines whether the power receiving information about the apparatus corresponding to one piece of identification information recorded on the RAM 107 has been received. On the other hand, if it is determined that if the number of pieces of the identification information received by the modulation and demodulation circuit 104 and recorded on the RAM 107 is "2 or more", then in step S412, the CPU 105 determines whether all the power receiving information about the apparatuses corresponding to the two or more pieces of identification information recorded on the RAM 107 has been received.

If it is determined that the connection information has been received by the modulation and demodulation circuit 104 (YES in step S404), then in step S411, the CPU 105 can determine whether the modulation and demodulation circuit 104 has received all the power receiving information via the power supply antenna 108 according to the connection information. In this case, in step S412, the CPU 105 determines whether both the power receiving information about the electronic device 200 corresponding to the identification information about the electronic device 200 included in the connection information and the power receiving information about the battery pack 300 corresponding to the identification information about the battery pack 300 included in the connection information, have already been received.

If the quantity information included in the connection information has a value "1", then in step S411, the CPU 105 determines whether the power receiving information about the electronic device 200 and the power receiving information about the battery pack 300 have been received.

If the number of the battery packs included in the connection information has a value "2", then in step S412, the CPU 105 determines whether the power receiving information about the electronic device 200, the power receiving information about the battery pack 300, and the power receiving information about the further battery pack (not illustrated) have been received. In addition, the CPU 105 can execute the determination in step S411 according to the number of the pieces of the identification information received by the modulation and demodulation circuit 104 in step S402 and the quantity information included in the connection information received by the modulation and demodulation circuit 104 in step S404.

In step S412, the CPU 105 executes a selection process for selecting at least one of the power receiving antenna 201 and the power receiving antenna 301. The selection processing is processing executed in charging the battery pack 300 with the power supplied from at least one of the power receiving antenna 201 and the power receiving antenna 301.

If the selection process in step S412 is executed by the CPU 105, either one of the electronic device 200 and the battery pack 300 charges the battery 311 with the power supplied from the power receiving antenna selected by the selection process in step S412. After the selection process by the CPU 105 is completed, the process from step S412 advances to step S413. The selection process will be described in detail below.

In step S413, the CPU 105 controls the matching circuit 103 and the modulation and demodulation circuit 104 to transmit a seventh command to the electronic device 200 and the battery pack 300. The seventh command is a command for notifying the start of output of the second power used for charging the battery 311 to at least one of the electronic device 200 and the battery pack 300. Then, the process advances from step S413 to step S414.

In step S414, the CPU 105 supplies the second power and the power information to the electronic device 200 and the battery pack 300 via the power supply antenna 108. The power information transmitted in step S414 is information including a value of the second power.

In this case, the CPU 105 controls the power transmission circuit 102 and the matching circuit 103 to output the second power to the electronic device 200 and the battery pack 300 via the power supply antenna 108. The second power is power higher than the predetermined power for the communicating with the electronic device 200 and the battery pack 300. Furthermore, the second power can be higher than the first power and be equal to or lower than a maximum power the power receiving antenna 201 can receive. And the second power can be equal to or lower than a maximum power the power receiving antenna 301 can receive. Then, the process advances from step S414 to step S415.

The CPU 105 can acquire the remaining capacity information about the battery 311 from at least one of the electronic device 200 and the battery pack 300 and adjust the second power according to the acquired remaining capacity information about the battery 311. Alternatively, the CPU 105 can adjust the second power according to power receiving information acquired from at least one of the electronic device 200 and the battery pack 300.

In step S415, the CPU 105 determines whether the CPU 105 ends the power supply process according to whether a user has executed an operation to the power supply apparatus 100 for stopping the power supply. If it is determined that the user has executed an operation to the power supply apparatus 100 for stopping the power supply (YES in step S415), the CPU 105 determines that the CPU 105 does not continue the power supply.

In this case, the CPU 105 controls the power transmission circuit 102 and the matching circuit 103 to adjust the power for outputting to the electronic device 200 and the battery pack 300 to a predetermined power for the communicating with the electronic device 200 and the battery pack 300. Then, the process advances from step S415 to step S416.

On the other hand, if it is determined that the user has not executed an operation to the power supply apparatus 100 for stopping the power supply (NO in step S415), the CPU 105 determines that the CPU 105 continues the power supply. Then, the process returns from step S415 to step S414. In this case, the CPU 105 continues the output of the second power to the electronic device 200 and the battery pack 300.

In step S416, the CPU 105 controls the matching circuit 103 and the modulation and demodulation circuit 104 to transmit an eighth command to the electronic device 200 and the battery pack 300. The eighth command is a command for notifying the end of the output of the second power to the electronic device 200 and the battery pack 300. Then, the process ends.

If it is determined that the modulation and demodulation circuit 104 has not received the connection information transmitted from the electronic device 200, (NO in step S404), then step S417 is performed. In step S417, the CPU 105 determines whether at least one of the power receiving information about the electronic device 200 and the power receiving information about the battery pack 300 has been received by the modulation and demodulation circuit 104 via the power supply antenna 108. If it is determined that at least one of the power receiving information about the electronic device 200 and the power receiving information about the battery pack 300 has been received by the modulation and demodulation circuit 104 via the power supply antenna 108 (YES in step S417), then the process advances from step S417 to step S413.

The CPU 105 executes control for storing at least one of the power receiving information about the electronic device 200 and the power receiving information about the battery pack 300, which is received by the modulation and demodulation circuit 104, on the RAM 107. If the modulation and demodulation circuit 104 has received the power receiving information about the electronic device 200, the CPU 105 executes control for recording the power receiving information about the electronic device 200 related to the identification information about the electronic device 200 on the RAM 107. On the other hand, if it is determined that the modulation and demodulation circuit 104 has received the power receiving information about the battery pack 300, the CPU 105 executes control for recording the power receiving information about the battery pack 300 related to the identification information about the battery pack 300 on the RAM 107.

On the other hand, if it is determined that the modulation and demodulation circuit 104 has not received the power receiving information about the electronic device 200 and the power receiving information about the battery pack 300 via the power supply antenna 108 (NO in step S417), then the process ends. More specifically, in step S417, the CPU 105 determines whether power receiving information about an apparatus corresponding to the identification information received in step S402 has been received.

In step S401, the CPU 105 determines whether the electronic device 200 and the battery pack 300 exist within the range in which the power transmitted from the power supply apparatus 100 can be received according to a change of the current supplied to the power supply antenna 108. However, the present exemplary embodiment is not limited to this. More specifically, alternatively, the CPU 105 can determine whether the electronic device 200 and the battery pack 300 exist within the range in which the power transmitted from the power supply apparatus 100 can be received according to a change of the voltage supplied to the power supply antenna 108.

Further alternatively, the CPU 105 can determine whether the electronic device 200 and the battery pack 300 exist within the range in which the power transmitted from the power supply apparatus 100 can be received according to a change of a standing wave ratio (SWR). Yet further alternatively, the CPU 105 can determine whether the electronic device 200 and the battery pack 300 exist within the range in which the power transmitted from the power supply apparatus 100 can be received according to a response to a command for verifying whether the electronic device 200 and the battery pack 300 exist, which can be periodically input.

In supplying the second power from the power supply apparatus 100 to the electronic device 200 and the battery pack 300 in step S414, the power supply apparatus 100 can execute operations for supplying the second power to the electronic device 200 and the battery pack 300 in parallel to each other. Alternatively, in supplying the second power from the power supply apparatus 100 to the electronic device 200 and the battery pack 300, the power supply apparatus 100 can supply the power to the electronic device 200 and the battery pack 300 by time division supplying.

Furthermore, in supplying power from the power supply apparatus 100 to the electronic device 200 and the battery pack 300, the power supply apparatus 100 can supply power to either one of the electronic device 200 and the battery pack 300 according to a result of the selection process executed by the CPU 105 in step S412. More specifically, if the power receiving antenna 201 has been selected by the power supply apparatus 100 in the selection process in step S412, the power supply apparatus 100 does not execute control for supplying power to the battery pack 300 but for supplying power to the electronic device 200. On the other hand, if the power receiving antenna 301 has been selected by the power supply apparatus 100 in the selection process in step S412, the power supply apparatus 100 does not execute control for supplying power to the electronic device 200 but for supplying power to the battery pack 300. Furthermore, if the electronic device 200 and the battery pack 300 have been selected by the selection process in step S412, the power supply apparatus 100 can supply power to the electronic device 200 and the battery pack 300. Even more specifically, if the power receiving antenna 201 has been selected by the power supply apparatus 100 in the selection process in step S412, the power supply apparatus 100 executes control so that power transmitted in step S414 is not received by the battery pack (in particular by transmitting the second command, S507). In this case the power supply apparatus also executes control for ensuring that power transmitted in step S414 is received by the electronic device 200 (in particular by transmitting the third command, S508). On the other hand, if the power receiving antenna 301 has been selected by the power supply apparatus 100 in the selection process in step S412, the power supply apparatus 100 executes control so that the power transmitted in step S414 is not received by the electronic device 200 (in particular by transmitting the fifth command, S505). In this case the power supply apparatus 100 also performs control so that power transmitted in step S414 is received by the battery pack 300 (in particular by transmitting the sixth command, S506). Furthermore, if the electronic device 200 and the battery pack 300 have both been selected by the selection process in step S412, the power supply apparatus 100 performs control so that both the electronic device 200 and the battery pack 300 receive power transmitted in step S414 (in particular by transmitting the third and sixth commands in steps S509 and S510).

In step S415, the CPU 105 determines whether the CPU 105 ends the power supply according to whether the user has executed an operation to the power supply apparatus 100 for stopping the power supply. However, the present exemplary embodiment is not limited to this. More specifically, the CPU 105 can determine whether the CPU 105 ends the power supply according to whether the modulation and demodulation circuit 104 has received a command for stopping the power supply from the electronic device 200 or the battery pack 300. Further alternatively, the CPU 105 can determine whether the CPU 105 ends the power supply according to whether the modulation and demodulation circuit 104 has received a command for notifying that the battery 311 has been fully charged.

Now, the selection process according to the present exemplary embodiment, which is executed by the power supply apparatus 100 in step S412 included in the power supply process, will be described in detail below with reference to the flow chart of FIG. 5. The selection process can be realized by the CPU 105 executing a computer program from the ROM 106.

Referring to FIG. 5, in step S501, the CPU 105 determines whether the electronic device 200 has a power receiving antenna 201. The determination as to whether the electronic device 200 has the power receiving antenna 201 can be executed by inquiring to the electronic device 200 whether the electronic device 200 has a power receiving antenna 201.

If it is determined that the electronic device 200 has the power receiving antenna 201 (YES in step S501), then the process advances from step S501 to step S502. On the other hand, if it is determined that the electronic device 200 does not have a power receiving antenna 201 (NO in step S501), then the process advances from step S501 to step S511. In step S501, the CPU 105 determines whether the electronic device corresponding to the identification information about the electronic device included in the connection information received in step S404 has a power receiving antenna.

In step S502, the CPU 105 determines whether the battery pack 300 has a power receiving antenna 301. The CPU 105 can determine whether the battery pack 300 has a power receiving antenna 301 according to the quantity information included in the connection information.

If it is determined that the modulation and demodulation circuit 104 has received the connection information (YES in step S404 (FIG. 4)), the CPU 105 determines whether the number of the battery packs, having a power receiving antenna and mounted on the electronic device, is equal to a value "0" based on the quantity information included in the connection information. If it is determined that the number of the battery packs is "0" (NO in step S502), the CPU 105 determines that the battery pack 300 does not have a power receiving antenna 301. On the other hand, if it is determined that the number of the battery packs is "1 or more" (YES in step S502), the CPU 105 determines that the battery pack 300 has a power receiving antenna 301.

On the other hand, if it is determined that the modulation and demodulation circuit 104 has not received the connection information yet (NO in step S404 (FIG. 4)), the CPU 105 determines that the battery pack 300, which is mounted on the electronic device 200, does not have the power receiving antenna 301 (NO in step S502). Alternatively, the CPU 105 can determine whether the battery pack 300 has the power receiving antenna 301 by inquiring the battery pack 300 whether the battery pack 300 has a power receiving antenna 301.

If it is determined that the battery pack 300 has a power receiving antenna 301 (YES in step S502), then the process advances from step S502 to step S503. On the other hand, if it is determined that the battery pack 300 does not have a power receiving antenna 301 (NO in step S502), then the process advances from step S502 to step S507.

In step S503, the CPU 105 determines whether the sum of the value of the current supplied to the battery 311, which is included in the power receiving information about the electronic device 200, and the value of the current to be supplied by the battery pack 300 to the battery 311 for charging, which is included in the power receiving information about the battery pack 300, is equal to or less than a predetermined value. In the following description, the sum of the value of the current supplied to the battery 311, which is included in the power receiving information about the electronic device 200, and the value of the current supplied to the battery 311 for charging, which is included in the power receiving information about the battery pack 300 will be simply referred to as a "first value". The CPU 105 calculates the first value according to the power receiving information about the electronic device 200 and the power receiving information about the battery pack 300.

In step S503, the CPU 105 transmits, to the battery pack 300, a command for requesting the battery pack 300 to transmit charging information about the battery pack 300. Then, the CPU 105 acquires the charging information about the battery pack 300 from the battery pack 300. In addition, the CPU 105 sets the predetermined value used in step S503 in the permissible current value included in the charging information acquired from the battery pack 300.

If it is determined that the first value is equal to or less than the predetermined value (YES in step S503), then the process advances from step S503 to step S509. On the other hand, if it is determined that the first value is not equal to or less than the predetermined value (NO in step S503), then the process advances from step S503 to step S504.

In step S504, the CPU 105 determines whether the power received, from the power supply apparatus 100, by the electronic device 200 is higher than the power received by the battery pack 300. More specifically, the CPU 105 determines whether the power received by the electronic device 200 is higher than the power received by the battery pack 300 according to the power receiving information about the electronic device and the power receiving information about the battery pack 300. In other words, if it is determined that the maximum power that the power receiving antenna 201 can receive is higher than the maximum power that the power receiving antenna 301 can receive, the power received by the electronic device 200 is higher than the power received by the battery pack 300. If it is determined that the power received by the electronic device 200 is higher than the power received by the battery pack 300 (YES in step S504), then the process advances from step S504 to step S507.

On the other hand, if it is determined that the maximum power that the power receiving antenna 201 can receive is not higher than the maximum power that the power receiving antenna 301 can receive, the power received by the electronic device 200 is equal to or lower than the power received by the battery pack 300. Accordingly, in this case, it is determined that the power received by the electronic device 200 is not higher than the power received by the battery pack 300 (NO in step S504). Then, the process advances from step S504 to step S505.

The CPU 105 executes the determination in step S504 according to the power receiving information about the electronic device 200, which has been acquired from the electronic device 200 in step S411 (FIG. 4), and the power receiving information about the battery pack 300, which has been acquired from the battery pack 300 in step S411 (FIG. 4).

In step S505, the CPU 105 controls the matching circuit 103 and the modulation and demodulation circuit 104 to transmit the fifth command to the electronic device 200. If the electronic device receives the fifth command, the electronic device 200 executes control for turning off the switching unit 212. Then, the process advances from step S505 to step S506.

In step S506, the CPU 105 controls the matching circuit 103 and the modulation and demodulation circuit 104 to transmit a sixth command to the battery pack 300. If the battery pack receives the sixth command, the battery pack 300 executes control for turning on the switching unit 312. Then, the process advances from step S506 to step S514.

In step S507, the CPU 105 controls the matching circuit 103 and the modulation and demodulation circuit 104 to transmit the second command to the battery pack 300. If the battery pack receives the second command, the battery pack 300 executes control for turning off the switching unit 312. Then, the process advances from step S507 to step S508.

In step S508, the CPU 105 controls the matching circuit 103 and the modulation and demodulation circuit 104 to transmit the third command to the electronic device 200. If the electronic device receives the third command, the electronic device 200 executes control for turning on the switching unit 212. Then, the process advances from step S508 to step S515.

In step S509, similarly to the processing in step S508, the CPU 105 controls the matching circuit 103 and the modulation and demodulation circuit 104 to transmit the third command to the electronic device 200. Then, the process advances from step S509 to step S510. In step S510, similarly to the process in step S506, the CPU 105 controls the matching circuit 103 and the modulation and demodulation circuit 104 to transmit the sixth command to the battery pack 300. Then, the process advances from step S510 to step S514.

In step S511, similarly to the process in step S502, the CPU 105 determines whether the battery pack 300 has the power receiving antenna 301. If it is determined that the battery pack 300 has the power receiving antenna 301 (YES in step S511), then the process advances from step S511 to step S505. On the other hand, if it is determined that the battery pack 300 does not have the power receiving antenna 301 (NO in step S511), then the process advances from step S511 to step S512.

In step S512, the CPU 105 controls the matching circuit 103 and the modulation and demodulation circuit 104 to transmit the second command to the battery pack 300. If the battery pack receives the second command, the CPU 305 of the received battery pack 300 turn off the switching unit 312. Then, the process advances from step S512 to step S513.

In step S513, the CPU 105 controls the matching circuit 103 and the modulation and demodulation circuit 104 to transmit the fifth command to the electronic device 200. When the fifth command is received, the CPU 205 of the electronic device 200 controls the switching unit 212 of the electronic device 200 to be turned off. Then, the processing ends.

In step S514, the CPU 105 controls the matching circuit 103 and the modulation and demodulation circuit 104 to transmit a ninth command to the electronic device 200. The ninth command is a command for instructing the electronic device 200 not to execute the control of the charging of the battery 311 by using the charging control unit 209. When the ninth command is received, the CPU 205 of the electronic device 200 controls the charging control unit 209 to stop its operation. Then, the process ends.

If the ninth command is transmitted to the electronic device 200, the charging control unit 309 of the battery pack 300 executes control of the charging of the battery 311. In this case, the CPU 105 controls the charging control unit 309 to detect the remaining capacity information about the battery 311 and the current and the voltage to be supplied to the battery 311 in addition to controlling the charging of the battery 311.

In step S514, the CPU 105 can transmit, to the battery pack 300, a command for instructing the control of the charging of the battery 311 to the charging control unit 309 of the battery pack 300 in addition to transmitting the ninth command to the electronic device 200.

In step S515, the CPU 105 controls the matching circuit 103 and the modulation and demodulation circuit 104 to transmit a tenth command to the battery pack 300. The tenth command is a command for instructing the battery pack 300 not to execute the control of the charging of the battery 311 by using the charging control unit 309. When the tenth command is received, the CPU 305 of the received battery pack 300 controls the charging control unit 309 to stop its operation. Then, the process ends.

If the tenth command is transmitted to the battery pack 300, the charging control unit 209 of the electronic device 200 controls the charging of the battery 311. In this case, the CPU 205 controls the charging control unit 209 to detect the remaining capacity information about the battery 311 and the current and the voltage to be supplied to the battery 311.

In step S515, the CPU 105 can transmit, to the electronic device 200, a command for instructing the charging control unit 209 of the electronic device 200 to charge the battery 311 in addition to transmitting the tenth command to the battery pack 300.

If the power that the electronic device 200 receives is higher than the power that the battery pack 300 receives (YES in step S504) and if the CPU 105 has executed the process in steps S507, S508, and S515, then the power receiving antenna 201 is selected by the selection process in step S412 (FIG. 4). If the power receiving antenna 201 has been selected by the selection process in step S412 and if the power supply apparatus 100 supplies the power for charging to the electronic device 200, the power receiving antenna 201 receives the power from the power supply apparatus 100.

The CPU 205 controls the electronic device 200 to supply the power received by the power receiving antenna 201 to the battery pack 300 via the matching circuit 202, the rectification and smoothing circuit 203, the regulator 208, the charging control unit 209, and the battery interface 210. When the power is supplied from the electronic device 200, the battery pack 300 receives the power from the electronic device 200 via the battery interface 310. The power received via the battery interface 310 from the electronic device 200 is supplied to the battery 311 via the charging control unit 309.

In addition, the CPU 205 controls the charging control unit 209 to execute the charging of the battery 311. Furthermore, the charging control unit 209 controls the current and the voltage for charging the battery 311 and detects the remaining capacity information about the battery 311. At this timing, the switching unit 312 has been kept turned off and the charging control unit 309 has been kept stopped. In this case, the power receiving antenna 201 and the matching circuit 202 are used to receive the power supplied from the power supply apparatus 100.

The components of the electronic device 200 that are used to receive the power from the power supply apparatus 100, such as the power receiving antenna 201 or the matching circuit 202, will hereafter be collectively referred to as a "first receiving unit" or "first receiving means".

If the power that the electronic device 200 receives is not higher than the power that the battery pack 300 receives (NO in step S504) and if the CPU 105 has executed the process in steps S505, S506, and S514, the power receiving antenna 301 is selected as a result of the selection process in step S412. If the power receiving antenna 301 has been selected as a result of the selection process in step S412 and the power supply apparatus 100 supplies the power for charging to the battery pack 300, the power receiving antenna 301 receives the power from the power supply apparatus 100.

The CPU 305 controls the battery pack 300 to supply the power received by the power receiving antenna 301 to the battery 311 via the matching circuit 302, the rectification and smoothing circuit 303, the regulator 308, and the charging control unit 309. In addition, the CPU 305 controls the charging control unit 309 to execute the charging of the battery 311. In charging the battery 311, the charging control unit 309 controls the current and the voltage for charging the battery 311 and detects the remaining capacity information about the battery 311.

At this timing, the switching unit 212 has been kept turned off and the charging control unit 209 remains stopped. In this case, the power receiving antenna 301 and the matching circuit 302 are used to receive the power supplied from the power supply apparatus 100. The components of the battery pack 300 used for receiving the power supplied from the power supply apparatus 100, such as the power receiving antenna 301 and the matching circuit 302, will be hereafter collectively referred to as a "second receiving unit" or "second receiving means".

If it is determined that the first value is equal to or less than the predetermined value (YES in step S503) and if the CPU 105 has executed the process in steps S509, S510, and S514, the power receiving antenna 201 and the power receiving antenna 301 are selected as a result of the selection process in step S412. If the power receiving antenna 201 and the power receiving antenna 301 have been selected as a result of the selection process in step S412 and the power supply apparatus 100 supplies the power for charging to the electronic device 200 and the battery pack 300, the power receiving antenna 201 and the power receiving antenna 301 receive the power from the power supply apparatus 100.

The CPU 205 executes control for supplying the power received by the power receiving antenna 201 to the battery 311 and for supplying the power received by the power receiving antenna 301 to the battery 311. In addition, the CPU 305 controls the charging control unit 309 to charge the battery 311 with the power supplied from the electronic device 200 to the battery 311 and the power received by the battery pack 300 without using the electronic device 200. In this case, the first receiving unit and the second receiving unit are used to receive the power supplied from the power supply apparatus 100.

In step S503, the CPU 105 determines whether the first value is equal to or less than the predetermined value to prevent an overcurrent from being supplied to the battery 311. However, the present exemplary embodiment is not limited to this. More specifically, the CPU 105 can prevent an overvoltage from being supplied to the battery 311.

A method for controlling the charging of the battery 311 while preventing an overvoltage from being supplied to the battery 311, which is executed by the CPU 105, will be described in detail below. In this case, the CPU 105 sets the first value used in step S503 as the sum of the value of the voltage supplied to the battery 311, which is included in the power receiving information about the electronic device 200, and the value of the voltage supplied to the battery 311, which is included in the power receiving information about the battery pack 300.

Furthermore, the CPU 105 sets the predetermined value used in step S503 as the permissible voltage value included in the charging information about the battery 311.

In this case, the CPU 105 can select the power receiving antenna to be used for charging the battery 311 while preventing an overvoltage from being supplied to the battery 311 according to a result of the determination as to whether the first value is equal to or less than the predetermined value.

An exemplary method for controlling the charging of the battery 311 while preventing an overpower from being supplied to the battery 311, which is executed by the CPU 105, will be described in detail below. In this case, the CPU 105 sets the first value used in step S503 as the sum of the value of the power supplied to the battery 311, which is calculated based on the power receiving information about the electronic device 200, and the value of the power supplied to the battery 311, which is calculated based on the power receiving information about the battery pack 300. Furthermore, in this case, the CPU 105 sets the predetermined value used in step S503 as a product of the permissible voltage value included in the charging information about the battery 311 and the permissible current value included in the charging information about the battery 311.

In this case, the CPU 105 can select the power receiving antenna used for charging the battery 311 while preventing an overpower from being supplied to the battery 311 according to a result of the determination as to whether the first value is equal to or less than the predetermined value.

In step S503, the CPU 105 can execute both the process for determining whether a sum of the value of the current supplied to the battery 311 included in the power receiving information about the electronic device 200 and the value of the current supplied to the battery 311 included in the power receiving information about the battery pack 300 is higher than the permissible current value and the process for determining whether the sum of the value of the voltage supplied to the battery 311 included in the power receiving information about the electronic device 200 and the value of the voltage supplied to the battery 311 included in the power receiving information about the battery pack 300 is higher than the permissible voltage value.

In step S504, the CPU 105 determines whether the power that the electronic device 200 receives is higher than the power that the battery pack 300 receives. However, the method for determining the level of the power received by the electronic device 200 is not limited to the above-described method. More specifically, the CPU 105 can determine whether the power received by the electronic device 200 is higher than the power received by the battery pack 300 according to a result of a comparison between the area of the power receiving antenna 201 and the area of the power receiving antenna 301.

If the area of the power receiving antenna 201 is greater than the area of the power receiving antenna 301, the CPU 105 determines that the power received by the electronic device 200 is higher than the power received by the battery pack 300 (YES in step S504). On the other hand, if it is determined that the area of the power receiving antenna 201 is not greater than the area of the power receiving antenna 301, the power received by the electronic device 200 is equal to or lower than the power received by the battery pack 300 (NO in step S504).

In this case, the CPU 105 acquires the information about the area of the power receiving antenna 201, which is recorded on the ROM 206, from the electronic device 200. In addition, the CPU 105 acquires the information about the area of the power receiving antenna 301, which is recorded on the ROM 306, from the battery pack 300. The CPU 105 executes the process in step S504 based on the above-described information.

Further alternatively, the CPU 105 can determine whether the power received by the electronic device is higher than the power received by the battery pack 300 according to a result of a comparison between the efficiency information included in the power receiving information about the electronic device 200 and the efficiency information included in the power receiving information about the battery pack 300.

If the efficiency of the power received by the power receiving antenna 201 is higher than the efficiency of the power received by the power receiving antenna 301, the CPU 105 determines that the power received by electronic device is higher than the power received by the battery pack 300 (YES in step S504). On the other hand, if the efficiency of the power received by the power receiving antenna 201 is not higher than the efficiency of the power received by the power receiving antenna 301, the CPU 105 determines that the power received by electronic device is equal to or lower than the power received by the battery pack 300 (NO in step S504).

In this case, the CPU 105 can compare the efficiency information included in the power receiving information about the electronic device 200 and the efficiency information included in the power receiving information about the battery pack 300 by using the power receiving information about the electronic device 200 and the power receiving information about the battery pack 300. Alternatively, in comparing the efficiency information, the CPU 105 can use the efficiency information included in the power receiving information about the electronic device 200, which is previously recorded on the ROM 206, and the efficiency information included in the power receiving information about the battery pack 300, which is previously recorded on the ROM 306.

In step S512, the CPU 105 transmits the second command to the battery pack 300. However, the CPU 105 can transmit the tenth command to the battery pack 300 as well in addition.

In step S513, the CPU 105 transmits the fifth command to the electronic device 200. However, the CPU 105 can transmit the ninth command to the electronic device 200 as well in addition.

If it is determined that the power receiving antenna 301 does not include the power receiving antenna 301 (NO in step S511) and if the process in steps S512 and S513 have been executed, then in the selection process in step S412, the CPU 105 selects neither the power receiving antenna 201 nor the power receiving antenna 301. In this case, the CPU 105 can end the power supply process without executing the process from step S416.

The first charging process according to the present exemplary embodiment, which is executed by the electronic device 200, will be described in detail below with reference to the flow chart of FIG. 6. The first charging process may be realized by the CPU 205 by executing a computer program from the ROM 206.

The first charging process illustrated in FIG. 6 is process executed by the electronic device 200 when the electronic device 200 is in a mode for charging. It is supposed that in executing the first charging process by using the CPU 205, the switching unit 212 has been turned on and a predetermined power for communicating with the electronic device 200 has been already supplied from the power supply apparatus 100 to the electronic device 200.

Referring to FIG. 6, in step S601, the CPU 205 determines whether the battery pack 300 has been mounted on the electronic device 200. More specifically, the CPU 205 determines whether the battery pack 300 has been mounted on the electronic device 200 according to a result of a determination as to whether the battery interface 210 of the electronic device 200 and the battery interface 310 of the battery pack 300 have been mutually connected.

If the battery interface 210 of the electronic device 200 and the battery interface 310 of the battery pack 300 are not connected, the CPU 205 determines that the battery pack 300 has not been mounted on the electronic device 200 (NO in step S601). Then, the process returns to step S601 and repeats the process in step S601.

On the other hand, if it is determined that the battery interface 210 of the electronic device 200 and the power receiving antenna 301 of the battery pack 300 are connected, the CPU 205 determines that the battery pack 300 has been mounted on the electronic device 200 (YES in step S601). Then, the process advances from step S601 to step S602.

In step S602, the CPU 205 determines whether the battery 311 has been fully charged. In particular, in step S602, the CPU 205 inputs an instruction to the battery pack 300 for requesting the battery pack 300 to transmit the identification information about the battery pack 300, the remaining capacity information about the battery 311, the charging information about the battery 311, and the information about whether the battery pack 300 includes the power receiving antenna 301. In the following description, the instruction input to the battery pack 300 for requesting the battery pack 300 to transmit the identification information about the battery pack 300, the remaining capacity information about the battery 311, the charging information about the battery 311, and the information about whether the battery pack 300 includes the power receiving antenna 301 will be simply referred to as a "first instruction".

If the battery pack 300 has received the first instruction from the electronic device 200, the CPU 305 reads the identification information about the battery pack 300, the charging information about the battery 311, and the information about whether the battery 311 includes the power receiving antenna 301 from the ROM 306. In addition, in this case, the CPU 305 requests the charging control unit 309 to transmit the remaining capacity information about the battery 311.

In addition, when the first instruction has been received, the CPU 305 transmits the remaining capacity information about the battery 311, the identification information about the battery 311, the charging information about the battery 311, and the information about whether the battery 311 includes the power receiving antenna 301 to the electronic device 200. When the above-described information is received, the CPU 205 records the remaining capacity information about the battery 311, the identification information about the battery 311, the charging information about the battery 311, and the information about whether the battery 311 includes the power receiving antenna 301 on the RAM 207.

In step S602, the CPU 205 determines whether the battery 311 has been fully charged according to the remaining capacity information about the battery 311, which has been recorded on the RAM 207. If it is determined that the battery 311 has been fully charged (YES in step S602), then the process ends. On the other hand, if it is determined that the battery 311 has not been fully charged (NO in step S602), then the process advances from step S602 to step S603.

In step S603, the CPU 205 controls the matching circuit 202 and the modulation and demodulation circuit 204 to transmits the identification information about the electronic device 200, which has been recorded on the ROM 206, to the power supply apparatus 100. After the identification information about the electronic device 200, which has been recorded on the ROM 206, is transmitted to the power supply apparatus 100, the process advances from step S603 to step S604.

In step S604, the CPU 205 determines whether the battery pack 300 includes the power receiving antenna 301. The determination as to whether the battery pack 300 includes the power receiving antenna 301 can be executed according to the information about whether the battery pack 300 includes the power receiving antenna 301, which has been acquired in step S602 by the CPU 205 from the battery pack 300. Alternatively, the determination as to whether the battery pack 300 includes the power receiving antenna 301 can be executed according to a reply to an inquiry input by the CPU 205 to the battery pack 300 about whether the power receiving antenna 301 has been provided.

If it is determined that the battery pack 300 includes the power receiving antenna 301 (YES in step S604), then the process advances from step S604 to step S605. On the other hand, if it is determined that the battery pack 300 does not include the power receiving antenna 301 (NO in step S604), then the process advances from step S604 to step S607.

In step S605, the CPU 205 controls the matching circuit 202 and the modulation and demodulation circuit 204 to transmit the connection information via the power receiving antenna 201. More specifically, in step S605, the CPU 205 determines whether the mounted battery pack includes the power receiving antenna according to the number of battery packs mounted on the electronic device 200.

In other words, the CPU 205 detects the quantity information, which is information about the number of battery packs mounted on the electronic device 200 which have a power receiving antenna, from the battery pack(s) mounted on the electronic device 200. In addition, the CPU 205 detects the identification information about the battery pack(s) mounted on the electronic device 200 which have a power receiving antenna.

In addition, the CPU 205 controls the matching circuit 202 and the modulation and demodulation circuit 204 to transmit, to the power supply apparatus 100, the detected quantity information and the connection information, which includes the identification information about the detected battery pack and the identification information about the electronic device 200. If it is determined that only one battery pack 300 has been mounted on the electronic device 200, the connection information has a value "1". When the connection information is transmitted to the power supply apparatus 100, the process advances from step S605 to step S606.

In step S606, the CPU 205 executes a first command receiving process for receiving a command from the power supply apparatus 100. Then, the process illustrated in FIG. 6 ends. The first command receiving process will be described in detail below.

In step S607, the CPU 205 executes control for turning on the switching unit 212. In addition, the CPU 205 instructs the battery pack 300 to turn off the switching unit 312 via the battery interface 210. Then, the process advances from step S607 to step S608. If either one of the power receiving antenna 301 and the switching unit 312 is not in the battery pack 300, the CPU 205 does not instruct the battery pack 300 to turn off the switching unit 312.

In step S608, the CPU 205 controls the matching circuit 202 and the modulation and demodulation circuit 204 to transmit the power receiving information about the electronic device 200, which has been read from the ROM 206, to the power supply apparatus 100 via the power receiving antenna 201. When the power receiving information about the electronic device 200 is transmitted to the power supply apparatus 100, the process advances from step S608 to step S606.

The first command receiving process according to the present exemplary embodiment, which is executed by the electronic device 200, will be described in detail below with reference to the flow chart of FIG. 7. The first command receiving process may be realized by the CPU 205 by executing a computer program from the ROM 206.

Figure 7B:
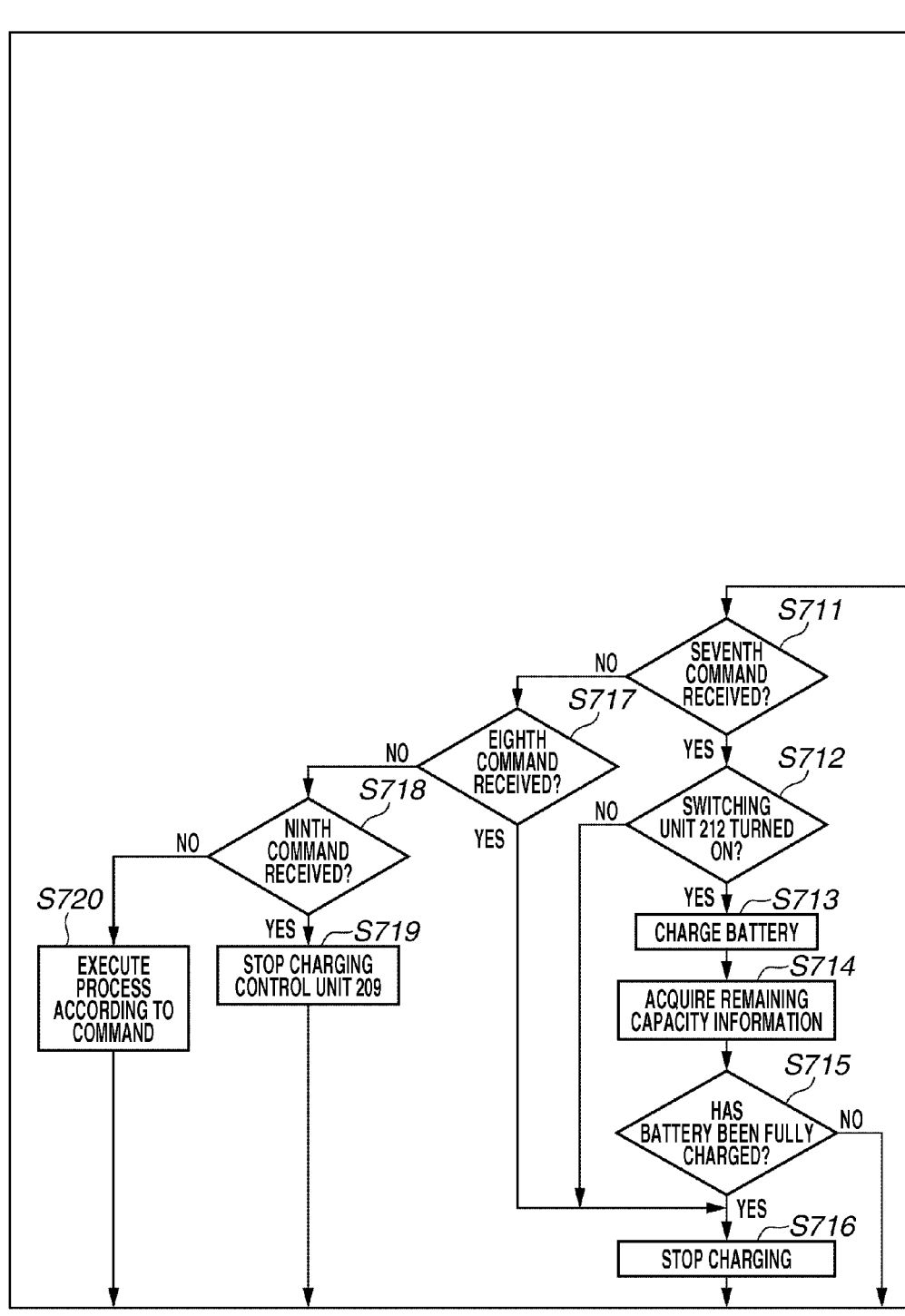
FIG. 7, which is composed of FIGS. 7A and 7B, is a flow chart illustrating an example of first command receiving process according to the first exemplary embodiment.

The first command receiving process illustrated in FIG. 7 is executed by the electronic device 200. In the present exemplary embodiment, it is supposed that before the CPU 205 starts the first command receiving process, a predetermined power for communicating with the electronic device 200 has already been supplied from the power supply apparatus 100 to the electronic device 200.

In addition, the first command receiving process illustrated in FIG. 7 can be executed by the electronic device 200 in step S606 (FIG. 6) or periodically after the first charging process illustrated in FIG. 6 is completed.

Referring to FIG. 7, in step S701, the CPU 205 determines whether the modulation and demodulation circuit 204 has received a command from the power supply apparatus 100. If it is determined that the modulation and demodulation circuit 204 has not received a command from the power supply apparatus 100 yet (NO in step S701), then the process ends. On the other hand, if it is determined that the modulation and demodulation circuit 204 has received a command from the power supply apparatus 100 (YES in step S701), then the process advances from step S701 to step S702.

In step S702, the CPU 205 controls the modulation and demodulation circuit 204 to analyze the command received from the power supply apparatus 100. Then, the process advances from step S702 to step S703. When the analysis of the command by the modulation and demodulation circuit 204 is completed, the modulation and demodulation circuit 204 transmits a result of the analysis to the CPU 205.

In step S703, the CPU 205 determines whether the command received by the modulation and demodulation circuit 204 is a first command according to the analysis result transmitted from the modulation and demodulation circuit 204. If it is determined that the command received by the modulation and demodulation circuit 204 is not the first command (NO in step S703), then the process advances from step S703 to step S705. On the other hand, if it is determined that the command received by the modulation and demodulation circuit 204 is the first command (YES in step S703), then the process advances from step S703 to step S704.

In step S704, the CPU 205 starts process for detecting the power receiving information about the electronic device 200. In executing the process for detecting the power receiving information about the electronic device 200, if the switching unit 212 has been turned off, the CPU 205 executes control for turning on the switching unit 212 and receives the first power and transmission information indicating the first power, which are transmitted from the power supply apparatus 100.

In addition, to detect power receiving information, which indicates the level of the first power that can be received, the CPU 205 controls the charging control unit 209 to measure the power received via the power receiving antenna 201. After starting the process for detecting the power receiving information about the electronic device 200, the process returns from step S704 to step S701.

In executing the process for detecting the power receiving information about the electronic device 200, the CPU 205 controls the matching circuit 202 and the modulation and demodulation circuit 204 to execute load modulation for transmitting an acknowledgment answer signal to the power supply apparatus 100 in response to the first command.

In step S705, the CPU 205 determines whether the command received by the modulation and demodulation circuit 204 is a third command according to the analysis result transmitted from the modulation and demodulation circuit 204. If it is determined that the command received by the modulation and demodulation circuit 204 is not the third command (NO in step S705), then the process advances from step S705 to step S707. On the other hand, if it is determined that the command received by the modulation and demodulation circuit 204 is the third command (YES in step S705), then the process advances from step S705 to step S706. In step S706, the CPU 205 executes control for turning on the switching unit 212. Then, the process returns from step S706 to step S701.

When the process for turning on the switching unit 212 is started, the CPU 205 controls the matching circuit 202 and the modulation and demodulation circuit 204 to execute load modulation for transmitting an acknowledgment answer signal to the power supply apparatus 100 in response to the third command.

In step S707, the CPU 205 determines whether the command received by the modulation and demodulation circuit 204 is a fourth command according to the analysis result transmitted from the modulation and demodulation circuit 204. If it is determined that the command received by the modulation and demodulation circuit 204 is not the fourth command (NO in step S707), then the process advances from step S707 to step S709. On the other hand, if it is determined that the command received by the modulation and demodulation circuit 204 is the fourth command (YES in step S707), then the process advances from step S707 to step S708.

In step S708, the CPU 205 executes control for stopping the process for detecting the power receiving information about the electronic device 200. In addition, the CPU 205 detects the power receiving information about the electronic device 200 according to power information indicating the first power, which has been received from the power supply apparatus 100, and information about the power received from the power supply apparatus 100, which has been measured by the charging control unit 209.

The CPU 205 records the detected power receiving information about the electronic device 200 on the RAM 207. In addition, the CPU 205 controls the matching circuit 202 and the modulation and demodulation circuit 204 to transmit the power receiving information about the electronic device 200 to the power supply apparatus 100. Then, the process returns from step S708 to step S701.

When the power receiving information about the electronic device 200 is transmitted to the power supply apparatus 100 via the power receiving antenna 201, the CPU 205 controls the matching circuit 202 and the modulation and demodulation circuit 204 to execute load modulation for transmitting an acknowledgment answer signal to the power supply apparatus 100 in response to the fourth command.

The power receiving information about the electronic device 200 transmitted to the power supply apparatus 100 in step S708 is not the power receiving information about the electronic device 200 previously recorded on the ROM 206 but is the power receiving information about the electronic device 200 detected by the charging control unit 209.

In step S708, for the area information about the power receiving antenna 201, which is included in the power receiving information about the electronic device 200 to be transmitted to the power supply apparatus 100, the CPU 105 can read the area information about the power receiving antenna 201 previously recorded on the ROM 206 and transmit the read area information about the power receiving antenna 201 to the power supply apparatus 100.

In step S709, the CPU 205 determines whether the command received by the modulation and demodulation circuit 204 is a fifth command according to the analysis result transmitted from the modulation and demodulation circuit 204. If it is determined that the command received by the modulation and demodulation circuit 204 is not the fifth command (NO in step S709), then the process advances from step S709 to step S711. On the other hand, if it is determined that the command received by the modulation and demodulation circuit 204 is the fifth command (YES in step S709), then the process advances from step S709 to step S710. In step S710, the CPU 205 executes control for turning off the switching unit 212. Then, the process returns from step S710 to step S701.

When the process for turning off the switching unit 212 is started, the CPU 205 controls the matching circuit 202 and the modulation and demodulation circuit 204 to execute load modulation for transmitting an acknowledgment answer signal to the power supply apparatus 100 in response to the fifth command.

In step S711, the CPU 205 determines whether the command received by the modulation and demodulation circuit 204 is a seventh command according to the analysis result transmitted from the modulation and demodulation circuit 204. If it is determined that the command received by the modulation and demodulation circuit 204 is not the seventh command (NO in step S711), then the process advances from step S711 to step S717. On the other hand, if it is determined that the command received by the modulation and demodulation circuit 204 is the seventh command (YES in step S711), then the process advances from step S711 to step S712.

In step S712, the CPU 205 determines whether the switching unit 212 has been on. If it is determined that the switching unit 212 has been on (YES in step S712), then the process advances from step S712 to step S713. On the other hand, if it is determined that the switching unit 212 has not been on (NO in step S712), then the process advances from step S712 to step S716. In step S713, the CPU 205 controls the charging control unit 209 to start the charging of the battery 311. Then, the process advances from step S713 to step S714.

When the charging of the battery 311 is started, the CPU 205 controls the matching circuit 202 and the modulation and demodulation circuit 204 to execute load modulation for transmitting an acknowledgment answer signal to the power supply apparatus 100 in response to the seventh command. If the modulation and demodulation circuit 204 has received a ninth command from the power supply apparatus 100, in step S713, the CPU 205 controls the charging control unit 209 not to the charging of the battery 311.

In step S714, the CPU 205 controls the charging control unit 209 to detect the remaining capacity information about the battery 311. The remaining capacity information detected by the charging control unit 209 is recorded on the RAM 207. Then, the process advances from step S714 to step S715.

In step S715, the CPU 205 determines whether the battery 311 has been fully charged according to the remaining capacity information about the battery 311, which is detected by either one of the charging control unit 209 and the charging control unit 309. If it is determined that the battery 311 has been fully charged (YES in step S715), then the process advances from step S715 to step S716. On the other hand, if it is determined that the battery 311 has not been fully charged (NO in step S715), then the process returns from step S715 to step S701 while continuing the charging of the battery 311.

As described above, if it is determined that the battery 311 has been fully charged (YES in step S715), then the CPU 205 executes the process in step S716. In step S716, the CPU 205 controls the charging control unit 209 to stop the charging of the battery 311. Then, the process returns from step S716 to step S701.

In controlling the charging control unit 209 to stop the charging of the battery 311, the CPU 205 controls the charging control unit 209 not to stop the detection of the remaining capacity information about the battery 311.

In step S717, the CPU 205 determines whether the command received by the modulation and demodulation circuit 204 is an eighth command according to the analysis result transmitted from the modulation and demodulation circuit 204. If it is determined that the command received by the modulation and demodulation circuit 204 is not the eighth command (NO in step S717), then the process advances from step S717 to step S718. On the other hand, if it is determined that the command received by the modulation and demodulation circuit 204 is the eighth command (YES in step S717), then the process advances from step S717 to step S716.

If the result of the process in step S717 is "YES" and the CPU 205 executes the process in step S716, the CPU 205 controls the matching circuit 202 and the modulation and demodulation circuit 204 to execute load modulation for transmitting an acknowledgment answer signal to the power supply apparatus 100 in response to the eighth command.

In step S718, the CPU 205 determines whether the command received by the modulation and demodulation circuit 204 is a ninth command according to the analysis result transmitted from the modulation and demodulation circuit 204. If it is determined that the command received by the modulation and demodulation circuit 204 is not the ninth command (NO in step S718), then the process advances from step S718 to step S720. On the other hand, if it is determined that the command received by the modulation and demodulation circuit 204 is the ninth command (YES in step S718), then the process advances from step S718 to step S719.

In step S719, the CPU 205 controls the charging control unit 209 to stop its operation. More specifically, in this case, the charging control unit 209 neither charges the battery 311 nor detects the remaining capacity information about the battery 311.

When the operation of the charging control unit 209 is stopped, the CPU 205 controls the matching circuit 202 and the modulation and demodulation circuit 204 to execute load modulation for transmitting an acknowledgment answer signal to the power supply apparatus 100 in response to the ninth command. Then, the process returns from step S719 to step S701.

In step S720, the CPU 205 executes process according to command codes included in the analysis result transmitted from the modulation and demodulation circuit 204. In addition, the CPU 205 controls the matching circuit 202 and the modulation and demodulation circuit 204 to execute load modulation for transmitting an answer signal to the power supply apparatus 100 in response to the command codes included in the analysis result transmitted from the modulation and demodulation circuit 204. Then, the process returns from step S720 to step S701.

In step S719, the CPU 205 controls the charging control unit 209 to stop its operation. However, if the charging control unit 309 controls the charging of the battery 311 and if the charging control unit 309 has detected the remaining capacity information about the battery 311, the CPU 205 acquires the remaining capacity information about the battery 311 from the charging control unit 309.

In this case, the CPU 205 can determine whether the battery 311 has been fully charged according to the remaining capacity information about the battery 311 acquired from the charging control unit 309. In addition, if the modulation and demodulation circuit 204 has received a command for starting the operation of the charging control unit 209 from the power supply apparatus 100, the CPU 205 executes control for cancelling the stopping of the operation of the charging control unit 209 and controls the charging control unit 209 to start its operation.

Now, second charging process according to the present exemplary embodiment, which is executed by the battery pack 300, will be described in detail below with reference to the flow chart of FIG. 8. The second charging process can be realized by the CPU 305 by executing a computer program from the ROM 306.

Figure 8:
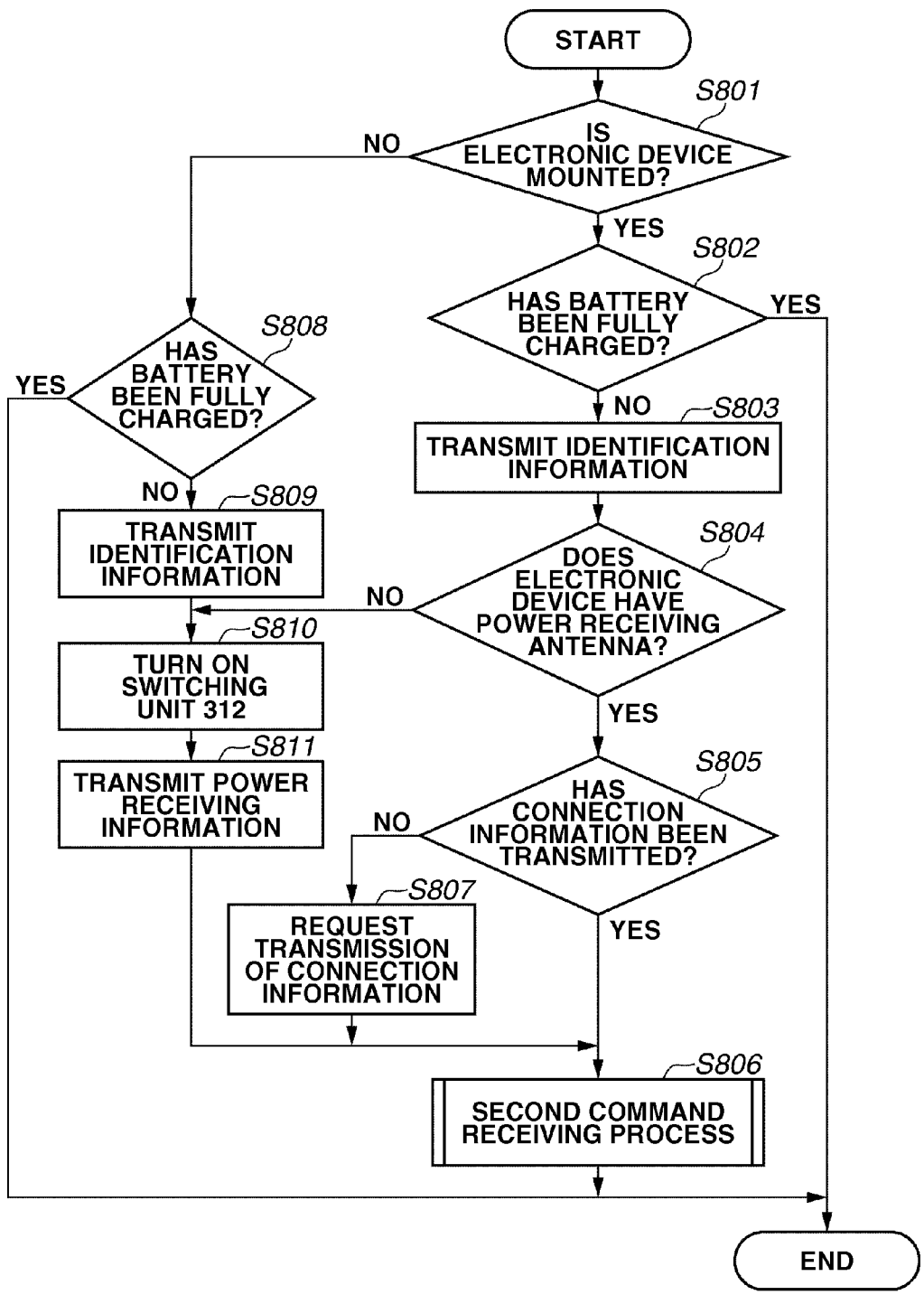
FIG. 8 is a flow chart illustrating an example of second charging process according to the first exemplary embodiment.

The second charging process illustrated in FIG. 8 is executed by the battery pack 300 when the battery pack 300 is in a mode for charging. In executing the second charging process by the CPU 305, it is supposed that the switching unit 312 has been turned on and a predetermined power for a communication with the battery pack 300 has already been supplied from the power supply apparatus 100 to the battery pack 300.

Referring to FIG. 8, in step S801, the CPU 305 determines whether the battery pack 300 has been mounted on the electronic device 200. More specifically, the CPU 305 determines whether the battery pack 300 has been mounted on 200 according to a result of a determination as to whether the battery interface 310 of the battery pack 300 and the battery interface 210 of the electronic device 200 are connected.

If the battery interface 310 of the battery pack 300 and the battery interface 210 of the electronic device 200 are not connected, the CPU 305 determines that the battery pack 300 has not been mounted on the electronic device 200 (NO in step S801). Then, the process advances from step S801 to step S808. On the other hand, if it is determined that the battery interface 310 of the battery pack 300 is connected to the battery interface 210 of the electronic device 200 (YES in step S801), then the process advances from step S801 to step S802.

In step S802, the CPU 305 determines whether the battery 311 has been fully charged. More specifically, the CPU 305 determines whether the battery 311 has been fully charged according to the remaining capacity information about the battery 311, which has been detected by the charging control unit 309 and recorded on the RAM 207.

If it is determined that the battery 311 has been fully charged (YES in step S802), then the process ends. On the other hand, if it is determined that the battery 311 has not been fully charged (NO in step S802), then the process advances from step S802 to step S803.

In step S803, the CPU 305 controls the matching circuit 302 and the modulation and demodulation circuit 304 to transmit the identification information about the battery pack 300, which is recorded on the ROM 306, to the power supply apparatus 100. In addition, the CPU 305 transmits the remaining capacity information about the battery 311, the identification information about the battery 311, the charging information about the battery 311, and the information indicating whether the battery pack 300 includes the power receiving antenna 301 to the electronic device 200. Then, the process advances from step S803 to step S804.

The CPU 305 can transmit the identification information about the battery pack 300, the remaining capacity information about the battery 311, the identification information about the battery 311, the charging information about the battery 311, and the information indicating whether the battery pack 300 includes the power receiving antenna 301 to the electronic device 200 according to an instruction from the electronic device 200.

In step S804, the CPU 305 determines whether the electronic device 200 includes the power receiving antenna 201. For the determination as to whether the electronic device 200 includes the power receiving antenna 201, the CPU 305 can inquire the electronic device 200 about whether the electronic device 200 includes the power receiving antenna 201.

If it is determined that the electronic device 200 includes the power receiving antenna 201 (YES in step S804), then the process advances from step S804 to step S805. On the other hand, if it is determined that the electronic device 200 does not include the power receiving antenna 201 (NO in step S804), then the process advances from step S804 to step S810.

In step S805, the CPU 305 determines whether the electronic device 200 has transmitted the connection information to the power supply apparatus 100 via the power receiving antenna 201. The determination as to whether the electronic device 200 has transmitted the connection information to the power supply apparatus 100 via the power receiving antenna 201 can be executed according to a reply to an inquiry from the CPU 305 to the electronic device 200 as to whether the electronic device 200 has transmitted the connection information.

If it is determined that the electronic device 200 has transmitted the connection information to the power supply apparatus 100 via the power receiving antenna 201 (YES in step S805), then the process advances from step S805 to step S806. On the other hand, if it is determined that the electronic device 200 has not transmitted the connection information to the power supply apparatus 100 via the power receiving antenna 201 yet (NO in step S805), then the process advances from step S805 to step S807.

In step S806, the CPU 205 executes a process for receiving a second command from the power supply apparatus 100.

Then, the process illustrated in FIG. 8 ends. The second-command receiving process will be described in detail below.

In step S807, the CPU 305 inputs an instruction to the electronic device 200, via the battery interface 310, for requesting the transmission of the connection information to the power supply apparatus 100. When the instruction is received, the electronic device 200 transmits the connection information to the power supply apparatus 100. Then, the process advances from step S807 to step S806.

In step S808, similar to the process in step S802, the CPU 305 determines whether the battery 311 has been fully charged. If it is determined that the battery 311 has been fully charged (YES in step S808), then the process ends. On the other hand, if it is determined that the battery 311 has not been fully charged (NO in step S808), then the process advances from step S808 to step S809.

In step S809, the CPU 305 controls the matching circuit 302 and the modulation and demodulation circuit 304 to transmit the identification information about the battery pack 300, which is recorded on the ROM 306, to the power supply apparatus 100. At the timing of the process in step S809, the battery pack 300 has not been mounted on the electronic device 200. Accordingly, the CPU 305 does not transmit the identification information about the battery pack 300, the remaining capacity information about the battery 311, the identification information about the battery 311, the charging information about the battery 311, and the information indicating whether the battery pack 300 includes the power receiving antenna 301 to the electronic device 200. Then, the process advances from step S809 to step S810.

In step S810, the CPU 305 executes control for turning on the switching unit 312. Then, the process advances from step S810 to step S811. In step S811, the CPU 305 controls the matching circuit 302 and the modulation and demodulation circuit 304 to transmit the power receiving information about the battery pack 300, which has been read from the ROM 306, to the power supply apparatus 100 via the power receiving antenna 301. When the power receiving information about the battery pack 300 is transmitted to the power supply apparatus 100, the process advances from step S811 to step S806.

Exemplary second command receiving process according to the present exemplary embodiment, which is executed by the battery pack 300, will be described in detail below with reference to the flow chart of FIG. 9. The second command receiving process can be realized by the CPU 305 by executing a computer program from the ROM 306.

Figure 9B:
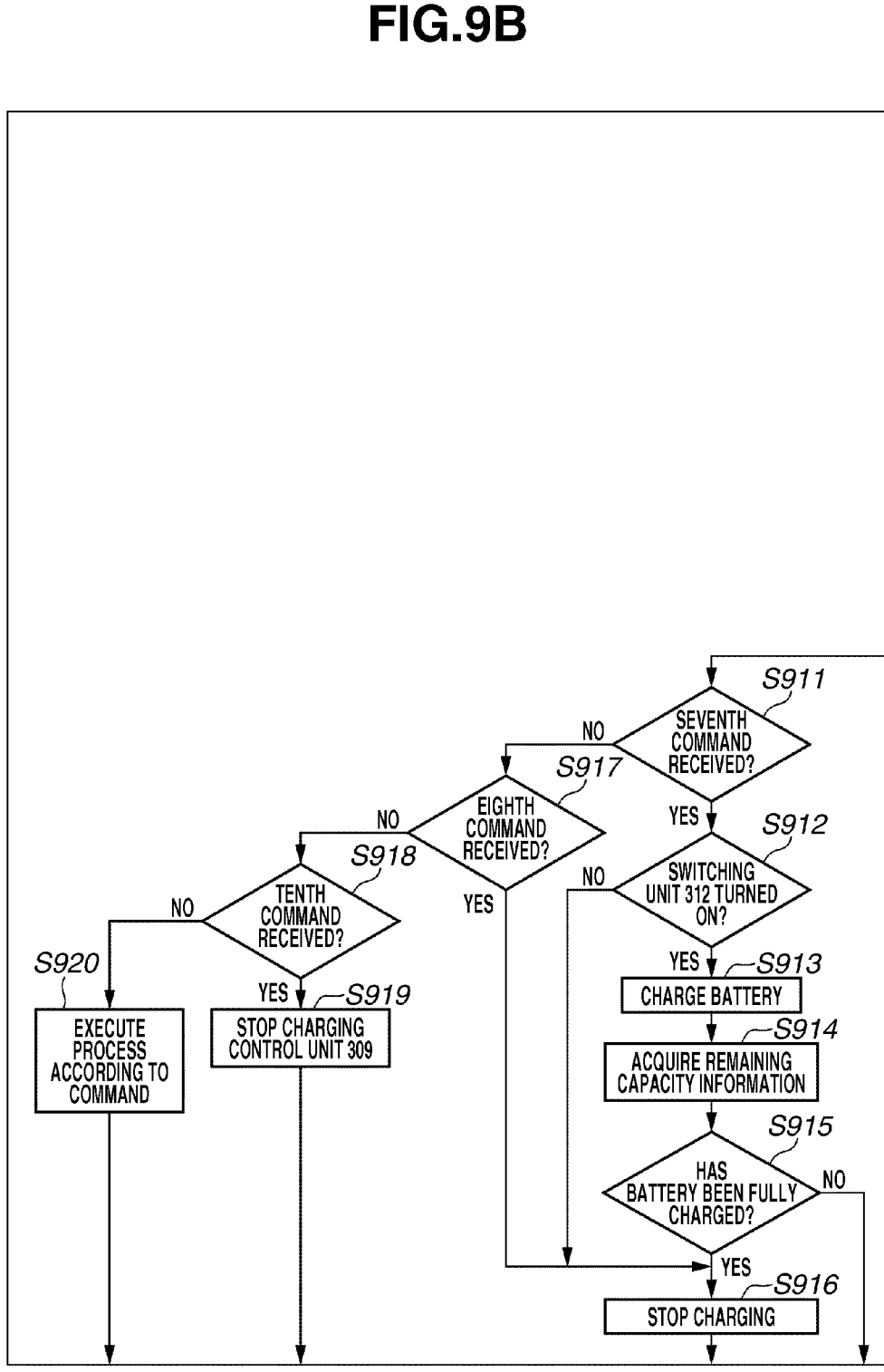
FIG. 9, which is composed of FIGS. 9A and 9B, is a flow chart illustrating an example of second command receiving process according to the first exemplary embodiment.

The second command receiving process illustrated in FIG. 9 is executed by the battery pack 300 as described above. When the second command receiving process is executed by the CPU 305, it is supposed that a power for executing a communication with the battery pack 300 has been supplied from the power supply apparatus 100 to the battery pack 300.

In addition, the second command receiving process illustrated in FIG. 9 can be executed by the battery pack 300 in step S806 (FIG. 8) or when the modulation and demodulation circuit 304 has received a command from the power supply apparatus 100.

Referring to FIG. 9, in step S901, the CPU 305 determines whether the modulation and demodulation circuit 304 has received a command from the power supply apparatus 100. If it is determined that the modulation and demodulation circuit 304 has not received a command from the power supply apparatus 100 (NO in step S901), then the process ends. On the other hand, if it is determined that the modulation and demodulation circuit 304 has received a command from the power supply apparatus 100 (YES in step S901), then the process advances from step S901 to step S902.

In step S902, the CPU 305 controls the modulation and demodulation circuit 304 to analyze the command received from the power supply apparatus 100. Then, the process advances from step S902 to step S903. When the analysis on the command by the modulation and demodulation circuit 304 is completed, the modulation and demodulation circuit 304 transmits a result of the analysis to the CPU 305.

In step S903, the CPU 305 determines whether the command received by the modulation and demodulation circuit 304 is a first command according to the result of the analysis transmitted from the modulation and demodulation circuit 304. If it is determined that the command received by the modulation and demodulation circuit 304 is not the first command (NO in step S903), then the process advances from step S903 to step S905. On the other hand, if it is determined that the command received by the modulation and demodulation circuit 304 is the first command (YES in step S903), then the process advances from step S903 to step S904.

In step S904, the CPU 205 starts a process for detecting the power receiving information about the battery pack 300. In this case, if the switching unit 312 has been off, the CPU 305 executes control for turning on the switching unit 312. In addition, the CPU 305 receives the first power and transmission information about the first power, which are transmitted from the power supply apparatus 100.

In addition, to detect power receiving information, which indicates the level of the first power that can be received, the CPU 305 controls the charging control unit 309 to measure the power received via the power receiving antenna 301. After starting the process for detecting the power receiving information about the battery pack 300, the process returns from step S904 to step S901.

In executing the process for detecting the power receiving information about the battery pack 300, the CPU 305 controls the matching circuit 302 and the modulation and demodulation circuit 304 to execute load modulation for transmitting an acknowledgment answer signal to the power supply apparatus 100 in response to the first command.

In step S905, the CPU 305 determines whether the command received by the modulation and demodulation circuit 304 is a second command according to the analysis result transmitted from the modulation and demodulation circuit 304. If it is determined that the command received by the modulation and demodulation circuit 304 is not the second command (NO in step S905), then the process advances from step S905 to step S907. On the other hand, if it is determined that the command received by the modulation and demodulation circuit 304 is the second command (YES in step S905), then the process advances from step S905 to step S906.

In step S906, the CPU 305 executes control for turning off the switching unit 312. Then, the process returns from step S906 to step S901. When the process for turning off the switching unit 312 is started, the CPU 305 controls the matching circuit 302 and the modulation and demodulation circuit 304 to execute load modulation for transmitting an acknowledgment answer signal to the power supply apparatus 100 in response to the second command.

In step S907, the CPU 305 determines whether the command received by the modulation and demodulation circuit 304 is a fourth command according to the analysis result transmitted from the modulation and demodulation circuit 304. If it is determined that the command received by the modulation and demodulation circuit 304 is not the fourth command (NO in step S907), then the process advances from step S907 to step S909. On the other hand, if it is determined that the command received by the modulation and demodulation circuit 304 is the fourth command (YES in step S907), then the process advances from step S907 to step S908.

In step S908, the CPU 305 executes control for stopping the process for detecting the power receiving information about the battery pack 300. In addition, the CPU 305 detects the power receiving information about the battery pack 300 according to power information about the first power, which has been received from the power supply apparatus 100, and information about the power received from the power supply apparatus 100, which has been measured by the charging control unit 309.

The CPU 305 records the detected power receiving information about the battery pack 300 on the RAM 307. In addition, the CPU 305 controls the matching circuit 302 and the modulation and demodulation circuit 304 to transmit the power receiving information about the battery pack 300 to the power supply apparatus 100. Then, the process returns from step S908 to step S901.

When the power receiving information about the battery pack 300 is transmitted to the power supply apparatus 100 via the power receiving antenna 301, the CPU 305 controls the matching circuit 302 and the modulation and demodulation circuit 304 to execute load modulation for transmitting an acknowledgment answer signal to the power supply apparatus 100 in response to the fourth command.

The power receiving information about the battery pack 300 transmitted to the power supply apparatus 100 in step S908 is not the power receiving information about the battery pack 300 previously recorded on the ROM 306 but is the power receiving information about the battery pack 300 detected by the charging control unit 309. The area information about the power receiving antenna 301 transmitted to the power supply apparatus 100 in step S908 is read by the CPU 305 from the ROM 306.

In step S909, the CPU 305 determines whether the command received by the modulation and demodulation circuit 304 is a sixth command according to the result of the analysis transmitted from the modulation and demodulation circuit 304. If it is determined that the command received by the modulation and demodulation circuit 304 is not the sixth command (NO in step S909), then the process advances from step S909 to step S911. On the other hand, if it is determined that the command received by the modulation and demodulation circuit 304 is the sixth command (YES in step S909), then the process advances from step S909 to step S910.

In step S910, the CPU 305 executes control for turning on the switching unit 312. Then, the process returns from step S910 to step S901. When the process for turning on the switching unit 312 is started, the CPU 305 controls the matching circuit 302 and the modulation and demodulation circuit 304 to execute load modulation for transmitting an acknowledgment answer signal to the power supply apparatus 100 in response to the sixth command.

In step S911, the CPU 305 determines whether the command received by the modulation and demodulation circuit 304 is a seventh command according to the analysis result transmitted from the modulation and demodulation circuit 304. If it is determined that the command received by the modulation and demodulation circuit 304 is not the seventh command (NO in step S911), then the process advances from step S911 to step S917. On the other hand, if it is determined that the command received by the modulation and demodulation circuit 304 is the seventh command (YES in step S911), then the process advances from step S911 to step S912.

In step S912, the CPU 305 determines whether the switching unit 312 has been on. If it is determined that the switching unit 312 has been on (YES in step S912), then the process advances from step S912 to step S913. On the other hand, if it is determined that the switching unit 312 has not been on (NO in step S912), then the process advances from step S912 to step S916.

In step S913, the CPU 305 controls the charging control unit 309 to start the charging of the battery 311. Then, the process advances from step S913 to step S914. When the charging of the battery 311 is started, the CPU 305 controls the matching circuit 302 and the modulation and demodulation circuit 304 to execute load modulation for transmitting an acknowledgment answer signal to the power supply apparatus 100 in response to the seventh command. If the modulation and demodulation circuit 304 has received a tenth command from the power supply apparatus 100, in step S913, the CPU 305 controls the charging control unit 309 not to start the charging of the battery 311.

In step S914, the CPU 305 controls the charging control unit 309 to detect the remaining capacity information about the battery 311. The remaining capacity information about the battery 311 detected by the charging control unit 309 is recorded on the RAM 307. Then, the process advances from step S914 to step S915.

In step S915, the CPU 305 determines whether the battery 311 has been fully charged according to the remaining capacity information about the battery 311, which is detected by either one of the charging control unit 209 and the charging control unit 309. If it is determined that the battery 311 has been fully charged (YES in step S915), then the process advances from step S915 to step S916. On the other hand, if it is determined that the battery 311 has not been fully charged (NO in step S915), then the process returns from step S915 to step S901.

If it is determined that the battery 311 has been fully charged, then the CPU 305 executes the process in step S916. In step S916, the CPU 305 controls the charging control unit 309 to stop the charging of the battery 311. Then, the process returns from step S916 to step S901. In controlling the charging control unit 309 to stop the charging of the battery 311 in step S916, the CPU 305 controls the charging control unit 309 not to stop the detection of the remaining capacity information about the battery 311.

In step S917, the CPU 305 determines whether the command received by the modulation and demodulation circuit 304 is an eighth command according to the analysis result transmitted from the modulation and demodulation circuit 304. If it is determined that the command received by the modulation and demodulation circuit 304 is not the eighth command (NO in step S917), then the process advances from step S917 to step S918. On the other hand, if it is determined that the command received by the modulation and demodulation circuit 304 is the eighth command (YES in step S917), then the process from step S917 advances to step S916.

If the result of the process in step S917 is "YES" and the CPU 305 executes the process in step S916, the CPU 305 controls the matching circuit 302 and the modulation and demodulation circuit 304 to execute load modulation for transmitting an acknowledgment answer signal to the power supply apparatus 100 in response to the eighth command.

In step S918, the CPU 305 determines whether the command received by the modulation and demodulation circuit 304 is a tenth command according to the analysis result transmitted from the modulation and demodulation circuit 304. If it is determined that the command received by the modulation and demodulation circuit 304 is not the tenth command (NO in step S918), then the processing advances from step S918 to step S920. On the other hand, if it is determined that the command received by the modulation and demodulation circuit 304 is the tenth command (YES in step S918), then the process advances from step S918 to step S919.

In step S919, the CPU 305 controls the charging control unit 309 to stops the operation of the charging control unit 309. In this case, the charging control unit 309 neither charges the battery 311 nor detects the remaining capacity information about the battery 311. When the operation of the charging control unit 309 is stopped, the CPU 305 controls the matching circuit 302 and the modulation and demodulation circuit 304 to execute load modulation for transmitting an acknowledgment answer signal to the power supply apparatus 100 in response to the tenth command. Then, the process returns from step S919 to step S901.

In step S920, the CPU 305 executes process according to command codes included in the analysis result transmitted from the modulation and demodulation circuit 304. In addition, the CPU 305 controls the matching circuit 302 and the modulation and demodulation circuit 304 to execute load modulation for transmitting an answer signal to the power supply apparatus 100 in response to the command codes included in the analysis result transmitted from the modulation and demodulation circuit 304. Then, the process returns to step S901.

In step S919, the CPU 305 controls the charging control unit 309 to stop the operation of the charging control unit 309. However, if the charging control unit 209 controls the charging of the battery 311 and if the charging control unit 209 has detected the remaining capacity information about the battery 311, the CPU 305 acquires the remaining capacity information about the battery 311 from the charging control unit 209.

In this case, the CPU 305 can determine whether the battery 311 has been fully charged according to the remaining capacity information about the battery 311 acquired from the charging control unit 209. In addition, if the modulation and demodulation circuit 304 has received a command for starting the operation of the charging control unit 309 from the power supply apparatus 100, the CPU 305 executes control for cancelling the discontinuation of the operation of the charging control unit 309 and controls the charging control unit 309 to start the operation of charging control unit 309.

With the above-described configuration, in the charging system according to the present exemplary embodiment, the power supply apparatus 100 can charge the battery 311 while effectively preventing an overcurrent from being supplied to the battery 311 if the battery pack 300 having the power receiving antenna 301 is mounted on the electronic device 200. Accordingly, if the current to be supplied to the battery 311 with the power received by using the power receiving antenna 201 and the power receiving antenna 301 is equal to or lower than the predetermined value, the battery 311 is charged with the power received by using the power receiving antenna 201 and the power receiving antenna 301. With the above-described configuration, in the charging system according to the present exemplary embodiment, the battery 311 can be effectively charged by using the power receiving antenna 201 and the power receiving antenna 301 while effectively preventing an overcurrent from being applied to the battery 311 at the same time.

On the other hand, if the current to be supplied to the battery 311 with the power received by using the power receiving antenna 201 and the power receiving antenna 301 is higher than the predetermined value, the battery 311 is charged by using the antenna having the higher power receiving capacity of the power receiving antenna 201 and the power receiving antenna 301. With the above-described configuration, in the charging system according to the present exemplary embodiment, the battery 311 can be effectively charged by using the antenna having the high power receiving capacity while effectively preventing an overcurrent from being supplied to the battery 311 at the same time.

If the sum of the value of the voltage to be supplied to the battery 311, which is included in the power receiving information about the electronic device 200, and the value of the voltage to be supplied to the battery 311, which is included in the power receiving information about the battery pack 300, is used as the first value, the power supply apparatus 100 can charge the battery 311 while effectively preventing an overvoltage from being supplied to the battery 311.

Accordingly, if the voltage to be supplied to the battery 311 with the power received by using the power receiving antenna 201 and the power receiving antenna 301 is equal to or lower than the predetermined value, the battery 311 is charged with the power received by using the power receiving antenna 201 and the power receiving antenna 301. With the above-described configuration, in the charging system according to the present exemplary embodiment, the battery 311 can be effectively charged by using the power receiving antenna 201 and the power receiving antenna 301 while effectively preventing an overvoltage from being applied to the battery 311 at the same time.

On the other hand, if the voltage to be supplied to the battery 311 with the power received by using the power receiving antenna 201 and the power receiving antenna 301 is higher than the predetermined value, the battery 311 is charged by using the antenna having the higher power receiving capacity of the power receiving antenna 201 and the power receiving antenna 301. With the above-described configuration, in the charging system according to the present exemplary embodiment, the battery 311 can be effectively charged by using the antenna having the high power receiving capacity while effectively preventing an overvoltage from being supplied to the battery 311 at the same time.

If the sum of the value of the power to be supplied to the battery 311, which is included in the power receiving information about the electronic device 200, and the value of the power to be supplied to the battery 311, which is included in the power receiving information about the battery pack 300, is used as the first value, the power supply apparatus 100 can charge the battery 311 while effectively preventing an overpower from being applied to the battery 311.

Accordingly, if the power to be supplied to the battery 311 with the power received by using the power receiving antenna 201 and the power receiving antenna 301 is equal to or lower than the predetermined value, the battery 311 is charged with the power received by using the power receiving antenna 201 and the power receiving antenna 301. With the above-described configuration, in the charging system according to the present exemplary embodiment, the battery 311 can be effectively charged by using the power receiving antenna 201 and the power receiving antenna 301 while effectively preventing an overpower from being supplied to the battery 311 at the same time.

On the other hand, if the power to be supplied to the battery 311 with the power received by using the power receiving antenna 201 and the power receiving antenna 301 is higher than the predetermined value, the battery 311 is charged by using the antenna having the higher power receiving capacity of the power receiving antenna 201 and the power receiving antenna 301. With the above-described configuration, in the charging system according to the present exemplary embodiment, the battery 311 can be effectively charged by using the antenna having the high power receiving capacity while effectively preventing an overpower from being applied to the battery 311 at the same time.

The communication between the power supply apparatus 100 and the electronic device 200 can be executed by using a communication method other than ASK modulation. For example, the communication between the power supply apparatus 100 and the electronic device 200 can be executed by a wireless local area network (LAN). In this case, the power supply apparatus 100 includes a communication means or unit (not illustrated) that communicates with the electronic device 200 by a wireless LAN and the electronic device 200 includes a communication means or unit (not illustrated) that communicates with the power supply apparatus 100 by a wireless LAN.

In this case, even if the switching unit 212 has been off, the electronic device 200 can receive a command transmitted from the power supply apparatus 100 by using the communication unit (not illustrated) of the electronic device 200. In addition, the electronic device 200 can transmit a command to the power supply apparatus 100 via the communication unit (not illustrated) of the electronic device 200.

Similarly, the communication between the power supply apparatus 100 and the battery pack 300 can be executed by a communication method other than ASK modulation. For example, the communication between the power supply apparatus 100 and the battery pack 300 can be executed by a wireless LAN.

In this case, the power supply apparatus 100 includes a communication unit (not illustrated) that communicates with the battery pack 300 by a wireless LAN. In addition, the battery pack 300 includes a communication unit (not illustrated) that communicates with the power supply apparatus 100 by a wireless LAN.

In the present exemplary embodiment, if the battery pack 300 is mounted on the electronic device 200, the electronic device 200 executes the above-described process. However, the process executed by the electronic device 200 can realize the present invention if two or more battery packs are mounted on the electronic device 200.

The power supply apparatus 100 according to the present invention is not limited to the power supply apparatus 100 described above in the present exemplary embodiment. In addition, the electronic device 200 according to the present invention is not limited to the electronic device 200 described above in the present exemplary embodiment, either. Furthermore, the battery pack 300 according to the present invention is not limited to the battery pack 300 described above in the present exemplary embodiment, either. For example, the power supply apparatus 100, the electronic device 200, and the battery pack 300 according to the present invention can be realized by a system that includes a plurality of apparatuses.

Various process and functions described above in the first exemplary embodiment can be realized by a computer program. In this case, the computer program of the present invention can be executed on a computer (including a CPU) to implement various functions described above in the first exemplary embodiment. In particular the present invention relates to a computer program which on execution by a programmable power supply apparatus causes the power supply apparatus to implement various functions as described above.

The computer program according to the present invention can realize various process and functions described above in the first exemplary embodiment by utilizing an operating system (OS) that operates on a computer. The computer program according to the present invention is loaded from a computer-readable storage medium and is executed on a computer. For the computer-readable storage medium, a hard disk drive (HDD), an optical disc, a compact disc-read only memory (CD-ROM), a CD-recordable (CD-R), a memory card, or a ROM can be used.

In addition, the computer program according to the present invention can be provided to a computer from an external apparatus via a communication interface to be executed on the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-276167 filed Dec. 10, 2010, which is hereby incorporated by reference herein in its entirety.

What is claimed is:

1. A power supply apparatus comprising:
a power supply unit configured to wirelessly supply power to an electronic device and a battery device, wherein the electronic device includes a first power receiving unit configured to wirelessly receive power from the power supply apparatus, and the battery device includes a second power receiving unit configured to wirelessly receive power from the power supply apparatus; and
a control unit that (a) selects the first power receiving unit or the second power receiving unit when power that can be received by the first power receiving unit and the second power receiving unit from the power supply apparatus is higher than a predetermined value, (b) controls the electronic device so as to charge a battery included in the battery device by using the first power receiving unit without using the second power receiving unit if the first power receiving unit is selected, and (c) controls the battery device so as to charge the battery included in the battery device by using the second power receiving unit without using the first power receiving unit if the second power receiving unit is selected.

2. The power supply apparatus according to claim 1, wherein the control unit selects the first power receiving unit or the second power receiving unit, by using first information relating to the first power receiving unit and second information relating to the second power receiving unit, when power that can be received by the first power receiving unit and the second power receiving unit from the power supply apparatus is higher than the predetermined value.

3. The power supply apparatus according to claim 1, wherein the control unit selects the first power receiving unit when power that can be received by the first power receiving unit and the second power receiving unit from the power supply apparatus is higher than the predetermined value and when power received by the first power receiving unit from the power supply apparatus is higher than power received by the second power receiving unit from the power supply apparatus.

4. The power supply apparatus according to claim 1, wherein the control unit selects the second power receiving unit when power that can be received by the first power receiving unit and the second power receiving unit from the power supply apparatus is higher than the predetermined value and when power received by the first power receiving unit from the power supply apparatus is not higher than power received by the second power receiving unit from the power supply apparatus.

5. The power supply apparatus according to claim 1, wherein the control unit selects the first power receiving unit when power that can be received by the first power receiving unit and the second power receiving unit from the power supply apparatus is higher than the predetermined value and when a power receiving efficiency of the first power receiving unit is higher than a power receiving efficiency of the second power receiving unit.

6. The power supply apparatus according to claim 1, wherein the control unit selects the second power receiving unit when power that can be received by the first power receiving unit and the second power receiving unit from the power supply apparatus is higher than the predetermined value and when a power receiving efficiency of the first power receiving unit is not higher than a power receiving efficiency of the second power receiving unit.

7. The power supply apparatus according to claim 1, wherein, if the electronic device and the battery device are not connected, the battery included in the battery device is charged by using the second power receiving unit without using the first power receiving unit.

8. A method comprising:
wirelessly supplying power from a power supply apparatus to an electronic device and a battery device, wherein the electronic device includes a first power receiving unit configured to wirelessly receive power from the power supply apparatus, and the battery device includes a second power receiving unit configured to wirelessly receive power from the power supply apparatus;
selecting the first power receiving unit or the second power receiving unit when power that can be received by the first power receiving unit and the second power receiving unit from the power supply apparatus is higher than a predetermined value;
controlling the electronic device so as to charge a battery included in the battery device by using the first power receiving unit without using the second power receiving unit if the first power receiving unit is selected; and
controlling the battery device so as to charge the battery included in the battery device by using the second power receiving unit without using the first power receiving unit if the second power receiving unit is selected.

9. The method according to claim 8, wherein the first power receiving unit or the second power receiving unit is selected, by using first information relating to the first power receiving unit and second information relating to the second power receiving unit, when power that can be received by the first power receiving unit and the second power receiving unit from the power supply apparatus is higher than the predetermined value.

10. The method according to claim 8, wherein the first power receiving unit is selected when power that can be received by the first power receiving unit and the second power receiving unit from the power supply apparatus is higher than the predetermined value and when power received by the first power receiving unit from the power supply apparatus is higher than power received by the second power receiving unit from the power supply apparatus.

11. The method according to claim 8, wherein the second power receiving unit is selected when power that can be received by the first power receiving unit and the second power receiving unit from the power supply apparatus is higher than the predetermined value and when power received by the first power receiving unit from the power supply apparatus is not higher than power received by the second power receiving unit from the power supply apparatus.

12. The method according to claim 8, wherein the first power receiving unit is selected when power that can be received by the first power receiving unit and the second power receiving unit from the power supply apparatus is higher than the predetermined value and when a power receiving efficiency of the first power receiving unit is higher than a power receiving efficiency of the second power receiving unit.

13. The method according to claim 8, wherein the second power receiving unit is selected when power that can be received by the first power receiving unit and the second power receiving unit from the power supply apparatus is higher than the predetermined value and when a power receiving efficiency of the first power receiving unit is not higher than a power receiving efficiency of the second power receiving unit.

14. The method according to claim 8, wherein, if the electronic device and the battery device are not connected, the battery included in the battery device is charged by using the second power receiving unit without using the first power receiving unit.

15. A non-transitory storage medium that stores a program for causing a computer to execute a method, the method comprising:

wirelessly supplying power from a power supply apparatus to an electronic device and a battery device, wherein the electronic device includes a first power receiving unit configured to wirelessly receive power from the power supply apparatus, and the battery device includes a second power receiving unit configured to wirelessly receive power from the power supply apparatus;

selecting the first power receiving unit or the second power receiving unit when power that can be received by the first power receiving unit and the second power receiving unit from the power supply apparatus is higher than a predetermined value;

controlling the electronic device so as to charge a battery included in the battery device by using the first power receiving unit without using the second power receiving unit if the first power receiving unit is selected; and controlling the battery device so as to charge the battery included in the battery device by using the second power receiving unit without using the first power receiving unit if the second power receiving unit is selected.

16. The power supply apparatus according to claim 1, wherein the power supply unit supplies power to the electronic device and the battery device by magnetic field resonance, electric field resonance, or electric field coupling.

17. The power supply apparatus according to claim 1, further comprising a resonance circuit configured to resonate with the first power receiving unit or the second power receiving unit so that the first power receiving unit or the second power receiving unit can wirelessly receive power from the power supply apparatus.

18. The method according to claim 8, further comprising causing a power supply unit to supply power to the electronic device and the battery device by magnetic field resonance, electric field resonance, or electric field coupling.

19. The method according to claim 8, further comprising causing a resonance circuit to resonate with the first power receiving unit or the second power receiving unit so that the first power receiving unit or the second power receiving unit can wirelessly receive power from the power supply apparatus.

* * * * *